(12) United States Patent
Clark

(10) Patent No.: US 10,751,915 B2
(45) Date of Patent: Aug. 25, 2020

(54) POLYETHYLENE TEREPHTHALATE COLORING SYSTEMS AND METHODS

(71) Applicant: Aladdin Manufacturing Corporation, Calhoun, GA (US)

(72) Inventor: Thomas R. Clark, Chattanooga, TN (US)

(73) Assignee: Aladdin Manufacturing Corporation, Calhoun, GA (US)

( * ) Notice: Subject to any disclaimer, the term of this patent is extended or adjusted under 35 U.S.C. 154(b) by 577 days.

(21) Appl. No.: 15/348,591

(22) Filed: Nov. 10, 2016

(65) Prior Publication Data

US 2018/0126595 A1 May 10, 2018

(51) Int. Cl.
*B29B 7/32* (2006.01)
*B29B 7/88* (2006.01)
(Continued)

(52) U.S. Cl.
CPC ............ *B29B 7/325* (2013.01); *B29B 7/7461* (2013.01); *B29B 7/88* (2013.01); *B29B 7/94* (2013.01); *B29B 13/022* (2013.01); *B29C 48/0255* (2019.02); *B29C 48/05* (2019.02); *B29C 48/362* (2019.02); *B29C 48/425* (2019.02); *B29C 48/435* (2019.02); *D01D 4/06* (2013.01); *D01D 5/08* (2013.01); *D01D 5/082* (2013.01); *D01F 1/04* (2013.01); *D01F 1/06* (2013.01);
(Continued)

(58) Field of Classification Search
None
See application file for complete search history.

(56) References Cited

U.S. PATENT DOCUMENTS

| 1,490,918 A | 4/1924 | Gaede |
| 2,146,532 A | 2/1939 | Crane |

(Continued)

FOREIGN PATENT DOCUMENTS

| AU | 2013267847 | 3/2014 |
| AU | 2014215998 | 9/2014 |

(Continued)

OTHER PUBLICATIONS

Office Action, dated Aug. 27, 2018, from corresponding U.S. Appl. No. 15/473,385.

(Continued)

*Primary Examiner* — Matthew J Daniels
*Assistant Examiner* — Mohammad M Ameen
(74) *Attorney, Agent, or Firm* — Brient IP Law, LLC

(57) ABSTRACT

A method of manufacturing a plurality of colors of bulked continuous carpet filament from a single multi-screw extruder which, in various embodiments, comprises: (A) passing PET through an extruder that melts the PET and purifies the resulting PET polymer melt; (B) splitting the extruded polymer melt into a plurality of melt streams and adding a colorant to each of the plurality of melt streams; (C) using one or more static mixers (e.g., thirty six static mixers) to substantially uniformly mix (e.g., homogeneously mix) each of the plurality of melt streams with its respective added colorant; and (D) feed each of the uniformly mixed and colored plurality of melt streams into a respective spinning machines that turns the polymer into filament for use in manufacturing carpet, rugs, and other products.

20 Claims, 9 Drawing Sheets

(51) Int. Cl.

| | | |
|---|---|---|
| *B29B 13/02* | (2006.01) | |
| *D01D 5/08* | (2006.01) | |
| *D01F 6/62* | (2006.01) | |
| *D01D 4/06* | (2006.01) | |
| *D01F 1/06* | (2006.01) | |
| *D01F 1/04* | (2006.01) | |
| *B29B 7/74* | (2006.01) | |
| *B29B 7/94* | (2006.01) | |
| *B29C 48/05* | (2019.01) | |
| *B29C 48/025* | (2019.01) | |
| *B29C 48/425* | (2019.01) | |
| *B29C 48/435* | (2019.01) | |
| *B29C 48/36* | (2019.01) | |
| *B29K 67/00* | (2006.01) | |
| *B29K 105/26* | (2006.01) | |
| *B29K 105/00* | (2006.01) | |
| *B29L 31/00* | (2006.01) | |
| *B29B 7/42* | (2006.01) | |
| *B29B 7/72* | (2006.01) | |
| *B29B 7/46* | (2006.01) | |

(52) U.S. Cl.
CPC ............... *D01F 6/62* (2013.01); *B29B 7/42* (2013.01); *B29B 7/46* (2013.01); *B29B 7/726* (2013.01); *B29K 2067/003* (2013.01); *B29K 2105/0032* (2013.01); *B29K 2105/26* (2013.01); *B29L 2031/731* (2013.01); *B29L 2031/7322* (2013.01); *D10B 2503/04* (2013.01)

(56) References Cited

U.S. PATENT DOCUMENTS

| | | | |
|---|---|---|---|
| 3,217,783 A | 11/1965 | Rodenacker | |
| 3,310,837 A | 3/1967 | Wittrock | |
| 3,357,049 A | 12/1967 | Spindler | |
| 3,608,001 A | 9/1971 | Kowalski et al. | |
| 3,825,236 A | 7/1974 | Hussmann et al. | |
| 3,865,528 A | 2/1975 | Roess | |
| 3,938,924 A | 2/1976 | Abella et al. | |
| 4,057,376 A | 11/1977 | Berger | |
| 4,057,607 A * | 11/1977 | Soehngen | C08J 3/226 264/108 |
| 4,128,386 A | 12/1978 | Wissinger et al. | |
| 4,172,477 A | 10/1979 | Reich | |
| 4,192,617 A | 3/1980 | Spielhoff | |
| 4,268,176 A | 5/1981 | Muller | |
| 4,269,798 A | 5/1981 | Ives | |
| 4,289,409 A | 9/1981 | Brand | |
| 4,370,302 A | 1/1983 | Suzuoka et al. | |
| 4,564,349 A | 1/1986 | Brown | |
| 4,591,487 A | 5/1986 | Fritsch | |
| 4,919,872 A | 4/1990 | Fintel | |
| 5,102,594 A | 4/1992 | Burlet et al. | |
| 5,108,711 A | 4/1992 | Chszaniecki | |
| 5,143,308 A | 9/1992 | Hally et al. | |
| 5,224,383 A | 7/1993 | Pinto et al. | |
| 5,225,130 A | 7/1993 | Deiringer | |
| 5,266,601 A | 11/1993 | Kyber et al. | |
| 5,306,803 A | 4/1994 | Arlt et al. | |
| 5,393,140 A | 2/1995 | Blach | |
| 5,424,013 A | 6/1995 | Lieberman | |
| 5,427,881 A | 6/1995 | Sacripante et al. | |
| 5,459,168 A | 10/1995 | Nasr et al. | |
| 5,497,562 A | 3/1996 | Pikus | |
| 5,503,788 A | 4/1996 | Lazareck et al. | |
| 5,510,073 A | 4/1996 | Kaegi et al. | |
| 5,532,035 A | 7/1996 | Corbin et al. | |
| 5,549,957 A | 8/1996 | Negola et al. | |
| 5,554,657 A | 9/1996 | Brownscombe et al. | |
| 5,613,285 A | 3/1997 | Chester et al. | |
| 5,623,012 A | 4/1997 | Hwo | |
| 5,715,584 A | 2/1998 | Coons, III et al. | |
| 5,804,115 A | 9/1998 | Burton et al. | |
| 5,836,682 A | 11/1998 | Blach | |
| 5,886,058 A | 3/1999 | Van Erden et al. | |
| 5,893,702 A | 4/1999 | Conrad et al. | |
| 5,932,691 A | 8/1999 | Khanin et al. | |
| 5,945,215 A | 8/1999 | Bersted et al. | |
| 5,951,159 A | 9/1999 | Schobert-Csongor et al. | |
| 5,958,548 A | 9/1999 | Negola et al. | |
| 5,961,054 A | 10/1999 | Nishibori | |
| 6,007,892 A | 12/1999 | Harwood et al. | |
| 6,074,084 A | 6/2000 | Kolossow | |
| 6,113,825 A | 9/2000 | Chuah | |
| 6,265,533 B1 | 7/2001 | Regel et al. | |
| 6,394,644 B1 * | 5/2002 | Streiff | B01F 5/0613 366/337 |
| 6,492,485 B1 | 12/2002 | Gohr et al. | |
| 6,620,354 B1 | 9/2003 | Bessemer et al. | |
| 6,627,127 B1 | 9/2003 | Piovoso et al. | |
| 6,722,117 B2 | 4/2004 | Belcher, Jr. et al. | |
| 6,773,718 B2 | 8/2004 | Seth et al. | |
| 6,780,941 B2 | 8/2004 | Studholme et al. | |
| 6,784,214 B1 | 8/2004 | Bacher et al. | |
| 6,852,256 B2 | 2/2005 | Borer et al. | |
| 6,866,171 B2 | 3/2005 | Ickinger | |
| 6,984,694 B2 | 1/2006 | Blasius, Jr. et al. | |
| 7,025,491 B2 | 4/2006 | Blach et al. | |
| 7,192,545 B2 | 3/2007 | Ekart et al. | |
| 7,198,400 B2 * | 4/2007 | Unterlander | B01F 5/0645 366/336 |
| 7,204,945 B2 | 4/2007 | Bonner | |
| 7,262,380 B1 | 8/2007 | Ulrichsen et al. | |
| 7,320,589 B2 | 1/2008 | Babin et al. | |
| 7,354,988 B2 | 4/2008 | Charati et al. | |
| 7,380,973 B2 | 6/2008 | Goedicke et al. | |
| 7,485,685 B2 | 2/2009 | Mihan et al. | |
| 7,513,677 B2 | 4/2009 | Gneuss et al. | |
| 7,594,453 B2 | 9/2009 | Blach | |
| 7,628,892 B2 | 12/2009 | Fini | |
| 7,654,725 B2 | 2/2010 | Sturm et al. | |
| 7,700,015 B2 | 4/2010 | Kern et al. | |
| 7,744,788 B2 | 6/2010 | Portier et al. | |
| 7,799,835 B2 | 9/2010 | Smith et al. | |
| 7,828,538 B2 | 11/2010 | Fellinger | |
| 7,902,262 B2 | 3/2011 | Armstrong et al. | |
| 7,935,737 B2 | 5/2011 | Gopal et al. | |
| 7,980,834 B2 | 7/2011 | Maguire | |
| 8,080,190 B2 | 12/2011 | Ichikawa et al. | |
| 8,147,738 B2 | 4/2012 | Boczon et al. | |
| 8,187,512 B2 | 5/2012 | Eloo et al. | |
| 8,398,752 B2 | 3/2013 | Brownstein et al. | |
| 8,404,755 B2 | 3/2013 | Sequeira | |
| 8,444,886 B2 | 5/2013 | Herve | |
| 8,471,972 B2 | 6/2013 | Tsubata | |
| 8,557,155 B2 | 10/2013 | Deiss et al. | |
| 8,597,553 B1 * | 12/2013 | Clark | B29D 99/0078 264/40.1 |
| 8,735,457 B2 | 5/2014 | Booth et al. | |
| 8,741,972 B2 | 6/2014 | Booth et al. | |
| 8,795,811 B2 | 8/2014 | Cloutier et al. | |
| 9,061,442 B2 | 6/2015 | Gneuss et al. | |
| 9,168,718 B2 | 10/2015 | Westwood et al. | |
| 9,409,363 B2 | 8/2016 | Clark | |
| 9,550,338 B2 | 1/2017 | Clark | |
| 9,630,353 B2 | 4/2017 | Clark | |
| 9,630,354 B2 | 4/2017 | Clark | |
| 9,636,860 B2 | 5/2017 | Clark | |
| 9,908,263 B2 | 3/2018 | Pichler et al. | |
| 9,975,278 B2 | 5/2018 | Rabiser et al. | |
| 10,124,513 B2 | 11/2018 | Clark | |
| 2002/0086077 A1 | 7/2002 | Noller et al. | |
| 2004/0053047 A1 | 3/2004 | Jackson et al. | |
| 2004/0082672 A1 | 4/2004 | Zeng et al. | |
| 2004/0140248 A1 | 7/2004 | Dauzvardis et al. | |
| 2004/0155374 A1 | 8/2004 | Hutchinson et al. | |
| 2004/0218469 A1 * | 11/2004 | Unterlander | B01F 5/0645 366/336 |
| 2005/0047267 A1 | 3/2005 | Gneuss et al. | |
| 2005/0263941 A1 * | 12/2005 | Reutter | D01D 1/065 264/211.22 |

(56) References Cited

U.S. PATENT DOCUMENTS

| | | | |
|---|---|---|---|
| 2006/0012074 A1 | 1/2006 | Booth et al. |
| 2006/0076705 A1 | 4/2006 | Fowler et al. |
| 2006/0284334 A1 | 12/2006 | Christel |
| 2007/0052131 A1 | 3/2007 | Fujimaki et al. |
| 2007/0261777 A1 | 11/2007 | Steckelberg et al. |
| 2008/0069916 A1 | 3/2008 | Regalia |
| 2008/0139700 A1 | 6/2008 | Roden et al. |
| 2008/0157425 A1 | 7/2008 | Rodgers et al. |
| 2008/0214701 A1 | 9/2008 | Wilms et al. |
| 2008/0272508 A1 | 11/2008 | Culbert et al. |
| 2008/0292831 A1 | 11/2008 | Juriga et al. |
| 2009/0004325 A1 | 1/2009 | Bacher et al. |
| 2009/0039542 A1 | 2/2009 | Morton-Finger |
| 2009/0270564 A1 | 10/2009 | Gorlier et al. |
| 2009/0286919 A1 | 11/2009 | Moeller et al. |
| 2010/0102475 A1 | 4/2010 | Moon et al. |
| 2010/0113626 A1 | 5/2010 | Liu |
| 2011/0177283 A1 | 7/2011 | Juriga |
| 2011/0257345 A1 | 10/2011 | Hoover, Jr. et al. |
| 2012/0070615 A1 | 3/2012 | Shi et al. |
| 2012/0279023 A1 | 11/2012 | Burout et al. |
| 2015/0069652 A1 | 3/2015 | Clark |
| 2015/0069655 A1 | 3/2015 | Clark |
| 2015/0076725 A1* | 3/2015 | Clark ............... B29B 17/0026 264/40.1 |
| 2015/0076744 A1 | 3/2015 | Clark |
| 2017/0136761 A1 | 5/2017 | Sieradzki et al. |
| 2017/0152611 A1 | 6/2017 | Clark |
| 2017/0275785 A1 | 9/2017 | Williams et al. |
| 2018/0126595 A1 | 5/2018 | Clark |
| 2018/0127893 A1 | 5/2018 | Clark |
| 2018/0362723 A1 | 12/2018 | Gneuss et al. |

FOREIGN PATENT DOCUMENTS

| | | |
|---|---|---|
| CH | 170967 A | 8/1934 |
| CN | 1391511 | 1/2003 |
| CN | 101444954 | 6/2009 |
| CN | 101778705 | 7/2010 |
| CN | 201872322 | 6/2011 |
| CN | 202072825 | 12/2011 |
| CN | 102990903 | 3/2013 |
| CN | 104040040 | 9/2014 |
| CN | 204265905 | 4/2015 |
| DE | 2243024 A1 | 3/1973 |
| DE | 3801574 | 8/1989 |
| DE | 4433593 | 6/1995 |
| DE | 19722278 | 12/1998 |
| DE | 102006033089 | 10/2007 |
| DE | 102008018686 | 10/2009 |
| DE | 102011082769 | 3/2013 |
| DE | 102013000316 | 7/2014 |
| DE | 102017111275 | 11/2018 |
| EP | 0846860 A2 | 6/1998 |
| EP | 0881054 | 12/1998 |
| EP | 1054083 | 11/2000 |
| EP | 1400332 | 3/2004 |
| EP | 2748358 | 7/2014 |
| EP | 3375916 | 9/2018 |
| GB | 2059864 | 4/1981 |
| GB | 1601699 | 11/1981 |
| GB | 2141844 | 1/1985 |
| JP | 63191823 | 8/1988 |
| JP | 2003530478 | 10/2003 |
| JP | 2007186830 | 7/2007 |
| WO | 2001021373 | 3/2001 |
| WO | 2002038276 | 5/2002 |
| WO | 2003033240 | 4/2003 |
| WO | 2004/026557 | 4/2004 |
| WO | 2008017843 | 2/2008 |
| WO | 2008083035 | 7/2008 |
| WO | 2008083820 | 7/2008 |
| WO | 2010133531 | 11/2010 |
| WO | 2011088437 | 7/2011 |
| WO | 2011095361 | 8/2011 |
| WO | 2012119165 | 9/2012 |
| WO | 2016081495 | 5/2016 |
| WO | 2018089346 | 5/2018 |

OTHER PUBLICATIONS

Office Action, dated Aug. 27, 2018, from corresponding U.S. Appl. No. 15/473,402.
Office Action, dated Sep. 7, 2018, from corresponding U.S. Appl. No. 15/396,143.
Extended European Search Report, dated Jul. 24, 2018, from corresponding European Patent Application No. 18170112.9.
"MRS extrusion technology offers new options in PET", Plastics Additives and Compounding, Elsevier Science, Oxofrd, GB, vol. 11, No. 2, Mar. 1, 2009 (Mar. 1, 2009), pp. 24-26, XP026067788, ISSN: 1464-391X. DOI:10.1016/S1464-391X(09)70050-9 [retrieved on Mar. 1, 2009] the whole document.
"Processing Technology: Processing of Polymer Melts," Oct. 31, 2007, Gneuss Kunststofftechnik GmbH, Dusseldorf, Germany.
Australian Office Action, dated Aug. 26, 2015, from corresponding Australian Patent Application No. 2014215998.
Australian Office Action, dated Dec. 5, 2016, from corresponding Australian Patent Application No. 2016234917.
Australian Office Action, dated May 9, 2014, from corresponding Australian Patent Application No. 2013267847.
Chinese Office Action, dated May 12, 2016, from corresponding Chinese Patent Application No. 201380003461.8.
Chinese Office Action, dated Sep. 14, 2015, from corresponding Chinese Patent Application No. 2013800034618.
Decision of Patent Grant, dated Dec. 12, 2014, from corresponding Korean Patent Application No. 10-2014-7016621.
European Office Action, dated Dec. 12, 2016, from corresponding European Patent Application No. 15158377.0.
Extended European Search Report, dated Aug. 26, 2015, from corresponding European Application No. 15158377.0.
Final Office Action, dated Dec. 24, 2015, from corresponding U.S. Appl. No. 14/256,261.
Final Office Action, dated Oct. 19, 2016, from corresponding U.S. Appl. No. 14/546,819.
Final Office Action, dated Oct. 19, 2016, from corresponding U.S. Appl. No. 14/546,837.
Final Office Action, dated Oct. 19, 2016, from corresponding U.S. Appl. No. 14/546,847.
Final Office Action, dated Oct. 20, 2016, from corresponding U.S. Appl. No. 14/546,796.
Gneuss M: "Multi Rotation System Extruder Leads to Breakthrough in Polymer Evacuation", International Fiber Journal, International Media Group, Charlotte, NC, US, vol. 23, No. 1, Feb. 1, 2008 (Feb. 1, 2008), pp. 40-41, XP001514827, ISSN: 1049-801X the whole document.
Hannemann, Innovative Aufbereitungslösung für PET mit uneingeschränkter FDA—Lebensmittelzulassung, Presentation, Mar. 15, 2012, 37 pages total, Gneuss Kunststofftechnik GmbH, Germany.
International Preliminary Report on Patentability, dated Dec. 11, 2014, from corresponding International Application No. PCT/US2013/040753.
International Search Report, dated Feb. 2, 2016, from corresponding International Application No. PCT/US2015/061116.
International Search Report, dated Feb. 2, 2016, from corresponding International Application No. PCT/US2015/061145.
International Search Report, dated Feb. 5, 2016, from corresponding International Application No. PCT/US2015/061174.
International Search Report, dated Jan. 20, 2016, from corresponding International Application No. PCT/US2015/061288.
International Search Report, dated Sep. 2, 2013, from corresponding International Application No. PCT/US2013/040753.
Korean Office Action, dated Aug. 18, 2014, from corresponding Korean Patent Application No. 10-2014-7016621.
Notice of Acceptance, dated Jun. 21, 2016, from corresponding Australian Patent Application No. 2014215998.

(56) References Cited

OTHER PUBLICATIONS

Notice of Acceptance, dated Nov. 10, 2014, from corresponding Australian Patent Application No. 2013267847.
Notice of Allowance, dated Apr. 13, 2016, from corresponding U.S. Appl. No. 14/256,261.
Notice of Allowance, dated Feb. 2, 2017, from corresponding U.S. Appl. No. 14/546,819.
Notice of Allowance, dated Feb. 2, 2017, from corresponding U.S. Appl. No. 14/546,837.
Notice of Allowance, dated Feb. 2, 2017, from corresponding U.S. Appl. No. 14/546,847.
Notice of Allowance, dated Feb. 3, 2017, from corresponding U.S. Appl. No. 14/546,796.
Notice of Allowance, dated Oct. 28, 2013, from corresponding U.S. Appl. No. 13/721,955.
Notice of Allowance, dated Sep. 12, 2016, from corresponding U.S. Appl. No. 13/892,713.
Notice of Opposition, dated Dec. 17, 2015, from corresponding European Application No. 13728264.6.
Office Action, dated Aug. 21, 2015, from corresponding U.S. Appl. No. 14/256,261.
Office Action, dated Jun. 1, 2016, from corresponding U.S. Appl. No. 14/546,837.
Office Action, dated Jun. 10, 2013, from corresponding U.S. Appl. No. 13/721,955.
Office Action, dated Jun. 13, 2016, from corresponding U.S. Appl. No. 14/546,847.
Office Action, dated Jun. 22, 2016, from corresponding U.S. Appl. No. 14/546,796.
Office Action, dated Jun. 30, 2016, from corresponding U.S. Appl. No. 13/892,740.
Office Action, dated Mar. 24, 2016, from corresponding U.S. Appl. No. 13/892,713.
Office Action, dated May 26, 2016, from corresponding U.S. Appl. No. 14/546,819.
Restriction Requirement, dated Apr. 30, 2013, from corresponding U.S. Appl. No. 13/721,955.
Vietnamese Office Action, dated Jul. 13, 2016, from corresponding Vietnamese Patent Application No. 1-2014-01079.
Written Opinion of the International Searching Authority, dated Feb. 2, 2016, from corresponding International Application No. PCT/US2015/061116.
Written Opinion of the International Searching Authority, dated Feb. 2, 2016, from corresponding International Application No. PCT/US2015/061145.
Written Opinion of the International Searching Authority, dated Feb. 5, 2016, from corresponding International Application No. PCT/US2015/061174.
Office Action, dated Apr. 9, 2018, from corresponding U.S. Appl. No. 15/204,645.
International Search Report, dated Apr. 12, 2018, from corresponding International Application No. PCT/US2018/015751.
Written Opinion of the International Searching Authority, dated Apr. 12, 2018, from corresponding International Application No. PCT/US2018/015751.
Notice of Allowance, dated Jul. 5, 2018, from corresponding U.S. Appl. No. 15/204,645.
Office Action, dated Oct. 9, 2018, from corresponding U.S. Appl. No. 15/419,955.
International Search Report, dated Nov. 19, 2018, from corresponding International Application No. PCT/US2018/051043.
Written Opinion of the International Searching Authority, dated Nov. 19, 2018, from corresponding International Application No. PCT/US2018/051043.
Notice of Allowance, dated Dec. 13, 2018, from corresponding U.S. Appl. No. 15/473,385.
Restriction Requirement, dated Feb. 5, 2019, from corresponding U.S. Appl. No. 16/220,733.
Written Opinion of the International Searching Authority, dated Jan. 20, 2016, from corresponding International Application No. PCT/US2015/061288.
Written Opinion of the International Searching Authority, dated Sep. 2, 2013, from corresponding International Application No. PCT/US2013/040753.
Notice of Allowance, dated Jan. 24, 2019, from corresponding U.S. Appl. No. 15/473,402.
Invitation to Pay Additional Search Fees, dated Jan. 5, 2018, from corresponding International Application Serial No. PCT/US2017/060359.
International Search Report, dated Mar. 1, 2018, from corresponding International Application Serial No. PCT/US2017/060359.
Written Opinion of the International Searching Authority, dated Mar. 1, 2018, from corresponding International Application Serial No. PCT/US2017/060359.
Jaecker M: "The Conceptual Concept of the Future // Advantages of the Negative-Conical Gangti EFE on Double-Screw Extruders", Kunststoffe, Carl Hanser Verlag, Munchen, DE, vol. 99, No. 12, Dec. 1, 2000 (2000-12-91), p. 64,66, XP990976191, ISSN: 9923-5563, figure 1.
Schiefer,Process Engineering, Rowohlt Taschenbuch Verlag GmbH, Aug. 1972.
Wikipedia, Polyethylene terephthalate, https://en.wikipedia.org/w/index.php?title=Polyethylene_terephthalate&oldid=491494734.
Office Action, dated Sep. 12, 2019, from corresponding U.S. Appl. No. 16/432,579.
Notice of Allowance, dated Oct. 10, 2019, from corresponding U.S. Appl. No. 16/432,579.
Ex Parte Quayle Action, dated Mar. 11, 2019, from corresponding U.S. Appl. No. 16/220,733.
Final Office Action, dated May 22, 2019, from corresponding U.S. Appl. No. 15/396,143.
Notice of Allowance, dated Apr. 17, 2019, from corresponding U.S. Appl. No. 16/220,731.
Notice of Allowance, dated May 1, 2019, from corresponding U.S. Appl. No. 15/419,955.
Austrian Patent Application No. A 330/2011, filed Mar. 10, 2011, entitled "Verfahren und Vorrichtung zum Entfernen von Verunreinigungen aus einer Kunststoffschmelze".
International Search Report, dated Jul. 5, 2012, from corresponding International Application No. PCT/AT2012/000052.
International Search Report, dated Oct. 30, 2019, from corresponding International Application No. PCT/US2019/042456.
Invitation to Pay Additional Fees, dated Oct. 18, 2019, from corresponding International Application No. PCT/US2019/042458.
Office Action, dated Nov. 25, 2019, from corresponding U.S. Appl. No. 15/804,501.
Written Opinion of the International Searching Authority, dated Oct. 30, 2019, from corresponding International Application No. PCT/US2019/042456.
Office Action, dated Dec. 2, 2019, from corresponding U.S. Appl. No. 16/664,730.
Office Action, dated Nov. 29, 2019, from corresponding U.S. Appl. No. 16/557,076.
Office Action, dated Jun. 18, 2019, from corresponding U.S. Appl. No. 16/402,583.
Restriction Requirement, dated Jul. 15, 2019, from corresponding U.S. Appl. No. 16/432,579.
Office Action, dated Jul. 23, 2019, from corresponding U.S. Appl. No. 16/041,442.
Notice of Allowance, dated Aug. 1, 2019, from corresponding U.S. Appl. No. 15/396,143.
Office Action, dated Aug. 8, 2019, from corresponding U.S. Appl. No. 16/409,599.
International Preliminary Report on Patentability, dated Aug. 8, 2019, from corresponding International Application No. PCT/US2018/015751.
Office Action, dated Aug. 13, 2019, from corresponding U.S. Appl. No. 16/213,694.

(56) References Cited

OTHER PUBLICATIONS

Botos, J., et al., "Color Measurement of Plastics—from Compounding via Pelletizing, up to Injection Molding and Extrusion," AIP Conference Proceedings 1593, 16 (2014), https://doi.org/10.1063/1.4873725, Feb. 17, 2015.

Machado, Almir De Souza, "Fundamentals of Cast Film Extrusion Technology," https://www.slideshare.net/ASMachado/fundamentals-of-cast-film-extrusion-technology, Dec. 2, 2013.

Notice of Allowance, dated Aug. 19, 2019, from corresponding U.S. Appl. No. 16/402,583.

Office Action, dated Aug. 26, 2019, from corresponding U.S. Appl. No. 16/220,905.

International Preliminary Report on Patentability, dated Mar. 26, 2020, from corresponding International Application No. PCT/US2018/051043.

International Search Report, dated Dec. 10, 2019, from corresponding International Application No. PCT/US2019/042458.

Office Action, dated Jan. 29, 2020, from corresponding U.S. Appl. No. 16/684,490.

Written Opinion of the International Searching Authority, dated Dec. 10, 2019, from corresponding International Application No. PCT/US2019/042458.

Notice of Allowance, dated Feb. 3, 2020, from corresponding U.S. Appl. No. 16/041,442.

Notice of Allowance, dated Feb. 12, 2020, from corresponding U.S. Appl. No. 16/220,905.

Office Action, dated Feb. 21, 2020, from corresponding U.S. Appl. No. 15/910,853.

Notice of Allowance, dated Feb. 28, 2020, from corresponding U.S. Appl. No. 16/664,730.

Notice of Allowance, dated Mar. 3, 2020, from corresponding U.S. Appl. No. 16/213,694.

Notice of Allowance, dated Apr. 9, 2020, from corresponding U.S. Appl. No. 16/684,490.

Office Action, dated May 27, 2020, from corresponding U.S. Appl. No. 16/131,397.

Final Office Action, dated Jun. 11, 2020, from corresponding U.S. Appl. No. 15/804,501.

Final Office Action, dated Jun. 11, 2020, from corresponding U.S. Appl. No. 16/409,599.

Gneuss website, https://www.gneuss.com/en/polymer-technologies/extrusion/mrs-extruder/, dated Jun. 5, 2020, pp. 1-4.

Final Office Action, dated Jun. 15, 2020, from corresponding U.S. Appl. No. 16/557,076.

Office Action, dated Jun. 24, 2020, from corresponding U.S. Appl. No. 16/348,117.

Final Office Action, dated Jul. 8, 2020, from corresponding U.S. Appl. No. 15/910,853.

Restriction Requirement, dated Jul. 1, 2020, from corresponding U.S. Appl. No. 16/041,586.

* cited by examiner

POLYETHYLENE TEREPHTHALATE COLORING SYSTEMS AND METHODS

BACKGROUND

Producing different colored polyethylene terephthalate (PET) (e.g., using virgin and/or recycled PET) for use in the production of products (e.g., such as carpet or other products) may result in unnecessary waste. Accordingly, there is a need to develop improved coloring systems for PET.

SUMMARY

According to particular embodiments, a method of manufacturing a plurality of colors of bulked continuous carpet filament from polyethylene terephthalate (PET) using a single multi-screw extruder, comprises: (A) providing a multi-screw extruder; (B) using the multi-screw extruder to at least partially melt the PET into a polymer melt and at least partially purify the polymer melt; (C) after the step of using the multi-screw extruder to at least partially melt the PET into a polymer melt and at least partially purify the polymer melt, splitting the polymer melt into a plurality of individual polymer streams downstream from the multi-screw extruder; (D) providing, for each of the plurality of individual polymer streams, a respective secondary extruder; (E) using each the respective secondary extruder to add a respective colorant to each of the plurality of individual polymer streams; (F) providing, for each of the plurality of individual polymer streams, one or more respective static mixers, each of the one or more respective static mixers comprising a substantially cylindrical housing and at least thirty individual static mixing elements disposed within the substantially cylindrical housing; (G) after the step of using each the respective secondary extruder to add a respective colorant to each of the plurality of individual polymer streams, using the one or more respective static mixers to substantially thoroughly mix each of the plurality of individual polymer streams with the respective colorant; and (F) after the step of using the one or more respective static mixers to substantially thoroughly mix each of the plurality of individual polymer streams with the respective colorant, forming each of the plurality of individual polymer streams into bulked continuous carpet filament.

In various embodiments, a method of manufacturing at least four colors of bulked continuous carpet filament from polyethylene terephthalate (PET) using a single multi-screw extruder comprises: (A) providing a multi-screw extruder; (B) using the multi-screw extruder to at least partially melt the PET into a polymer melt and at least partially purify the polymer melt; (C) after the step of using the multi-screw extruder to at least partially melt the PET into a polymer melt and at least partially purify the polymer melt, splitting the polymer melt into at least four individual polymer streams downstream from the multi-screw extruder; (D) providing, for each of the at least four individual polymer streams, a respective secondary extruder; (E) using each the respective secondary extruder to add a respective colorant to each of the at least four individual polymer streams; (F) providing, for each of the at least four individual polymer streams, one or more respective static mixers, each of the one or more respective static mixers comprising a substantially cylindrical housing and at least thirty six individual static mixing elements disposed within the substantially cylindrical housing; (G) after the step of using each the respective secondary extruder to add a respective colorant to each of the at least four individual polymer streams, using the one or more respective static mixers to substantially uniformly mix each of the at least four individual polymer streams with the respective colorant; and (F) after the step of using the one or more respective static mixers to substantially thoroughly mix each of the plurality of individual polymer streams with the respective colorant, forming each of the at least four individual polymer streams into bulked continuous carpet filament.

According to particular embodiments, a method of manufacturing at least four colors of bulked continuous carpet filament from recycled polyethylene terephthalate (PET) bottles using a single multi-screw extruder generally includes the steps of: (A) preparing the recycled PET bottles for extrusion; (B) extruding the prepared PET to melt and purify the recycled PET; and (C) forming the extruded molten PET into bulked continuous filament. In some embodiments, preparing the recycled PET for extrusion comprises: (A) providing a plurality of recycled PET bottles; (B) grinding the plurality of recycled PET bottles into a group of polymer flakes, the group of flakes comprising a first plurality of flakes that consist essentially of PET and a second plurality of flakes that do not consist essentially of PET; (C) washing the group of polymer flakes to remove at least a portion of one or more contaminants from a surface of the polymer flakes; (D) after the step of washing the first plurality of flakes: (i) scanning the washed group of flakes to identify the second plurality of flakes, and (ii) separating the second plurality of flakes from the first plurality of flakes.

In such embodiments, extruding the prepared PET to melt and purify the recycled PET may include, for example: (A) providing a multi-screw extruder that comprises: (i) a first satellite screw extruder, the first satellite screw extruder comprising a first satellite screw that is mounted to rotate about a central axis of the first satellite screw; (ii) a second satellite screw extruder, the second satellite screw extruder comprising a second satellite screw that is mounted to rotate about a central axis of the second satellite screw; (iii) a third satellite screw extruder, the third satellite screw extruder comprising a third satellite screw that is mounted to rotate about a central axis of the third satellite screw; (iv) a fourth satellite screw extruder, the fourth satellite screw extruder comprising a fourth satellite screw that is mounted to rotate about a central axis of the fourth satellite screw; and (v) a pressure regulation system that is adapted to maintain a pressure within the first, second, third, and fourth satellite screw extruders between about 0 millibars and about 5 millibars; (B) using the pressure regulation system to reduce a pressure within the first, second, third, and fourth satellite screw extruders to between about 0 millibars and about 5 millibars; (C) using the multi-screw extruder to at least partially melt the first plurality of flakes into a polymer melt and at least partially purify the polymer melt by, while maintaining the pressure within the first, second, third, and fourth satellite screw extruders between about 0 millibars and about 5 millibars, passing the polymer melt through the multi-screw extruder so that: (1) a first portion of the melt passes through the first satellite screw extruder, (2) a second portion of the melt passes through the second satellite screw extruder, (3) a third portion of the melt passes through the third satellite screw extruder, and (4) a fourth portion of the melt passes through the fourth satellite screw extruder.

In still further embodiments, forming the extruded molten PET into bulked continuous filament comprises: (A) after the step of using the multi-screw extruder to at least partially melt the first plurality of flakes into a polymer melt and at least partially purify the polymer melt, splitting the polymer melt into at least four individual polymer streams downstream from the multi-screw extruder, the at least four individual polymer streams comprising a first polymer stream, a second polymer stream, a third polymer stream, and a fourth polymer stream; (B) adding a first colorant to the first polymer stream, a second colorant to the second polymer stream, a third colorant to the third polymer stream, and a fourth colorant to the fourth polymer stream; (C) providing, for the first polymer stream, one or more first static mixers comprising at least 36 first static mixing elements; (D) providing, for the second polymer stream, one or more second static mixers comprising at least 36 second static mixing elements; (E) providing, for the third polymer stream, one or more third static mixers comprising at least 36 third static mixing elements; (F) providing, for the fourth polymer stream, one or more fourth static mixers comprising at least 36 fourth static mixing elements; (G) after the step of adding the first colorant to the first polymer stream, using the one or more first static mixers to substantially mix the first polymer stream with the first colorant; (H) after the step of adding the second colorant to the second polymer stream, using the one or more second static mixers to substantially mix the second polymer stream with the second colorant; (I) after the step of adding the third colorant to the third polymer stream, using the one or more third static mixers to substantially mix the third polymer stream with the third colorant; and (J) after the step of adding the fourth colorant to the fourth polymer stream, using the one or more fourth static mixers to substantially mix the fourth polymer stream with the fourth colorant.

In particular embodiments, the method further comprises: (A) providing a first spinning machine, a second spinning machine, a third spinning machine, and a fourth spinning machine; (B) after the step of using the one or more first static mixers to substantially mix the first polymer stream with the first colorant, forming the first polymer stream into a first colored bulked continuous carpet filament using the first spinning machine to form the first polymer stream into the first colored bulked continuous carpet filament; (C) after the step of using the one or more second static mixers to substantially mix the second polymer stream with the second colorant, forming the second polymer stream into a second colored bulked continuous carpet filament using the second spinning machine to form the second polymer stream into the second colored bulked continuous carpet filament; (D) after the step of using the one or more third static mixers to substantially mix the third polymer stream with the third colorant, forming the third polymer stream into a third colored bulked continuous carpet filament using the third spinning machine to form the third polymer stream into the third colored bulked continuous carpet filament; and (E) after the step of using the one or more fourth static mixers to substantially mix the fourth polymer stream with the fourth colorant, forming the fourth polymer stream into a fourth colored bulked continuous carpet filament using the fourth spinning machine to form the fourth polymer stream into the fourth colored bulked continuous carpet filament.

BRIEF DESCRIPTION OF THE DRAWINGS

Having described various embodiments in general terms, reference will now be made to the accompanying drawings, which are not necessarily drawn to scale, and wherein.

DETAILED DESCRIPTION OF VARIOUS EMBODIMENTS

Figure 1:
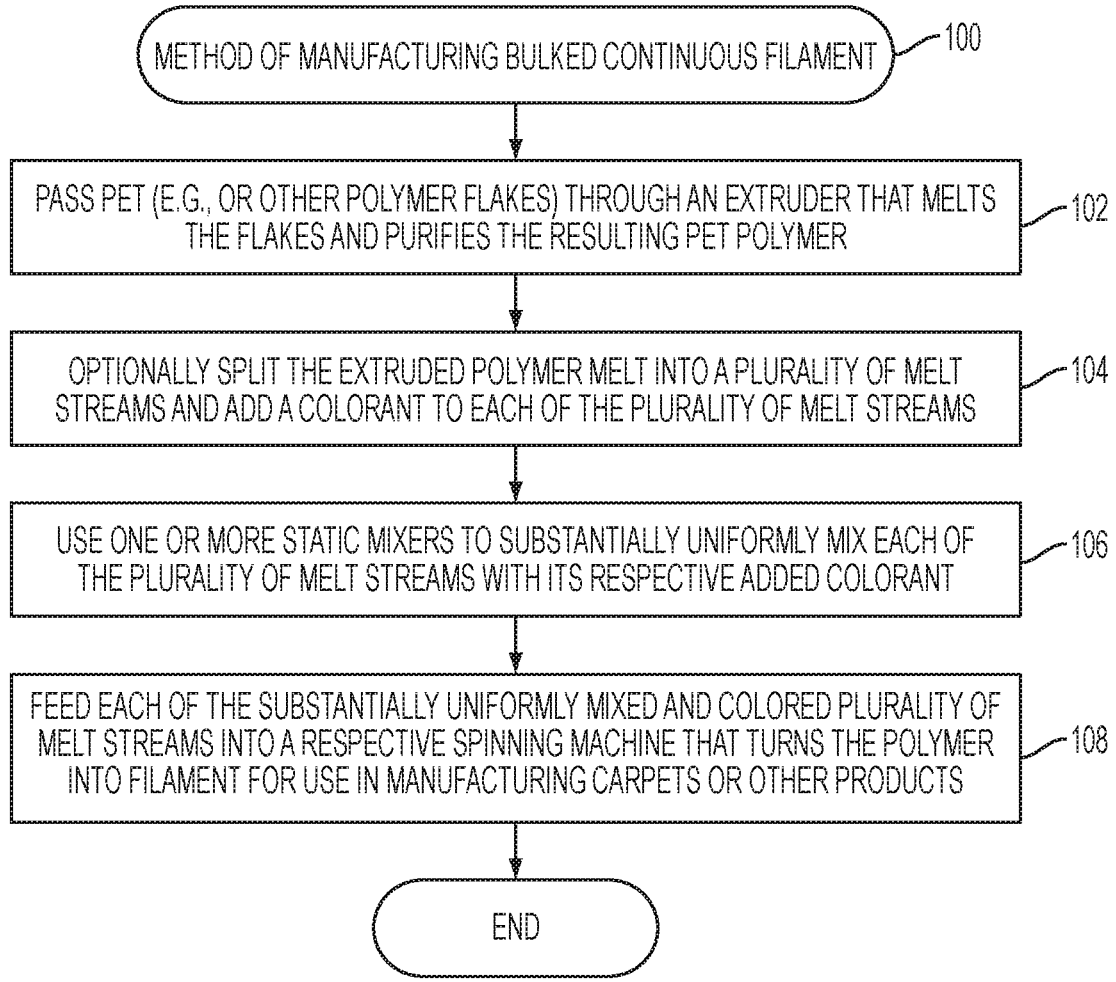
FIG. 1 depicts a high level overview of a manufacturing process for producing and coloring bulked continuous filament.

Various embodiments will now be described in greater detail. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Overview

New processes for producing and coloring fiber from recycled polymer (e.g., recycled PET polymer) and virgin polymer (e.g., virgin PET polymer) are described below. In various embodiments, these new processes may include, for example: (1) extruding a polymer (e.g., such as PET) using a primary extruder; (2) adding a colorant to the extruded polymer downstream from the primary extruder; (3) using one or more static mixers (e.g., up to thirty six static mixers) to substantially uniformly mix the extruded polymer and the added colorant; and (4) using a spinning machine to spin the uniformly mixed extruded polymer and added colorant into bulked continuous filament (e.g., carpet yarn) that has a color that is based on the added colorant. The process described herein may, for example, reduce an amount of waste related to changing a color of bulked continuous filament produced using a particular extruder when switching to a different colorant.

In various embodiments, the primary extruder comprises a Multi-rotating screw extruder (MRS extruder). In particular embodiments, the process further comprises: (1) splitting the molten polymer stream extruded from the primary extruder into a plurality of polymer streams (e.g., up to six polymer streams), each of the plurality of polymer streams having an associated spinning machine; (2) adding a colorant to each split polymer stream; (3) using one or more static mixers for each split polymer stream to substantially uniformly mix each split polymer stream and its respective colorant; and (4) spinning each polymer stream with its substantially uniformly mixed colorant into bulked continuous filament using the respective spinning machine. In such embodiments, a process for producing and coloring bulked continuous filament may utilize a single primary extruder to produce a plurality of different colored filaments (e.g., carpet yarn).

In various embodiments, this new process may, for example: (1) produce less waste than other processes when producing or changing a color of bulked continuous filament produced using a particular extruder; (2) facilitate the production of small batches of particular colors of filament (e.g., for use in rugs or less popular colors of carpet) at a relatively low cost; (3) increase a number of simultaneous filament colors that a single extruder can produce; and (4) etc. In at least one embodiment, the improved process results in reduction of waste of up to about 4000 pounds of fiber when switching from a first color to a second color (e.g., by adding the colorant downstream from the primary extruder rather than upstream).

II. More Detailed Discussion

FIG. 1 depicts a high level overview of a BCF manufacturing process 100 for producing and coloring BCF (bulked continuous filament), for example, for use in the production of carpet and other products. A BCF manufacturing process, according to a particular embodiment, may generally be broken down into four steps: (1) passing PET (e.g., or other polymer flakes) through an extruder that melts the flakes and purifies the resulting PET polymer (Step 102); (2) optionally splitting the extruded polymer melt into a plurality of melt streams and adding a colorant to each of the plurality of melt streams (Step 104); (3) using one or more static mixers to substantially uniformly mix each of the plurality of melt streams with its respective added colorant (Step 106); and (4) feeding each of the substantially uniformly mixed and colored plurality of melt streams into a respective spinning machine that turns the polymer into filament for use in manufacturing carpets (Step 108). These four steps are described in greater detail below.

Step 1: Using an Extrusion System to Melt and Purify PET

In various embodiments, the step of using an extrusion system to melt and purify PET (e.g., PET flakes and/or pellets) comprises: (A) preparing the PET for extrusion; and (B) using a suitable extruder to melt and purify the PET.

Preparing the PET for Extrusion

In particular embodiments, the step of preparing the PET for extrusion may vary based on a source of the PET. For example, in various embodiments, the process may utilize: (1) virgin PET (e.g., virgin PET pellets); (2) recycled PET (e.g., recycled PET flakes ground from recycled PET bottles and other suitable sources); and/or (3) a combination of virgin and recycled PET. In various embodiments in which the process utilizes recycled PET, the step of preparing the PET for extrusion may include sorting, grinding, washing and other steps designed to remove any impurities from the recycled PET prior to extrusion. These other PET preparation steps may, for example, be unnecessary in embodiments of the process that utilize virgin PET. Because using recycled PET in the process described herein may contribute to even further costs savings to those associated with a reduction in waste due to colorant changing, the process will be described below particularly with respect to recycled PET.

In a particular embodiment, preparing the PET for extrusion may include preparing flakes of PET polymer from post-consumer bottles or other sources of recycled PET. An exemplary process for preparing post-consumer bottles for use in the production of bulked continuous filament is described in U.S. Pat. No. 8,597,553 B1, entitled "Systems and Methods for Manufacturing Bulked Continuous Filament" and published on Dec. 3, 2013, which is hereby incorporated herein in its entirety. Generally speaking, the step of preparing flakes of PET polymer from post-consumer bottles may comprise, for example: (A) sorting post-consumer PET bottles and grinding the bottles into flakes; (B) washing the flakes; and (C) identifying and removing any impurities or impure flakes.

Sorting Post-Consumer PET Bottles and Grinding the Bottles into Flakes

In particular embodiments, bales of clear and mixed colored recycled post-consumer (e.g., "curbside") PET bottles (or other containers) obtained from various recycling facilities make-up the post-consumer PET containers for use in the process. In other embodiments, the source of the post-consumer PET containers may be returned 'deposit' bottles (e.g., PET bottles whose price includes a deposit that is returned to a customer when the customer returns the bottle after consuming the bottle's contents). The curbside or returned "post-consumer" or "recycled" containers may contain a small level of non-PET contaminates. The contaminants in the containers may include, for example, non-PET polymeric contaminants (e.g., PVC, PLA, PP, PE, PS, PA, etc.), metal (e.g., ferrous and non-ferrous metal), paper, cardboard, sand, glass or other unwanted materials that may find their way into the collection of recycled PET. The non-PET contaminants may be removed from the desired PET components, for example, through one or more of the various processes described below.

In particular embodiments, smaller components and debris (e.g., components and debris greater than 2 inches in size) are removed from the whole bottles via a rotating trammel. Various metal removal magnets and eddy current systems may be incorporated into the process to remove any metal contaminants. Near Infra-Red optical sorting equipment such as the NRT Multi Sort IR machine from Bulk Handling Systems Company of Eugene, Oreg., or the Spyder IR machine from National Recovery Technologies of Nashville, Tenn., may be utilized to remove any loose polymeric contaminants that may be mixed in with the PET flakes (e.g., PVC, PLA, PP, PE, PS, and PA). Additionally, automated X-ray sorting equipment such as a VINYL-CYCLE machine from National Recovery Technologies of Nashville, Tenn. may be utilized to remove remaining PVC contaminants.

In particular embodiments, the sorted material is taken through a granulation step (e.g., using a 50B Granulator machine from Cumberland Engineering Corporation of New Berlin, Wis.) to size reduce (e.g., grind) the bottles down to a size of less than one half of an inch. In various embodiments, the bottle labels are removed from the resultant "dirty flake" (e.g., the PET flakes formed during the granulation step) via an air separation system prior to entering the wash process.

Washing the Flakes

In particular embodiments, the "dirty flake" is then mixed into a series of wash tanks. As part of the wash process, in various embodiments, an aqueous density separation is utilized to separate the olefin bottle caps (which may, for example, be present in the "dirty flake" as remnants from recycled PET bottles) from the higher specific gravity PET flakes. In particular embodiments, the flakes are washed in a heated caustic bath to about 190 degrees Fahrenheit. In particular embodiments, the caustic bath is maintained at a concentration of between about 0.6% and about 1.2% sodium hydroxide. In various embodiments, soap surfactants as well as defoaming agents are added to the caustic bath, for example, to further increase the separation and cleaning of the flakes. A double rinse system then washes the caustic from the flakes.

In various embodiments, the flake is centrifugally dewatered and then dried with hot air to at least substantially remove any surface moisture. The resultant "clean flake" is then processed through an electrostatic separation system (e.g., an electrostatic separator from Carpco, Inc. of Jacksonville, Fla.) and a flake metal detection system (e.g., an MSS Metal Sorting System) to further remove any metal contaminants that remain in the flake. In particular embodiments, an air separation step removes any remaining label from the clean flake. In various embodiments, an electro-optical flake sorter based at least in part on Raman technology (e.g., a Powersort 200 from Unisensor Sensorsysteme GmbH of Karlsruhe, Germany) performs the final polymer separation to remove any non-PET polymers remaining in the flake. This step may also further remove any remaining metal contaminants and color contaminants.

In various embodiments, the combination of these steps delivers substantially clean (e.g., clean) PET bottle flake comprising less than about 50 parts per million PVC (e.g., 25 ppm PVC) and less than about 15 parts per million metals for use in the downstream extrusion process described below.

Identifying and Removing Impurities and Impure Flakes

In particular embodiments, after the flakes are washed, they are fed down a conveyor and scanned with a high-speed laser system 300. In various embodiments, particular lasers that make up the high-speed laser system 300 are configured to detect the presence of particular contaminates (e.g., PVC or Aluminum). Flakes that are identified as not consisting essentially of PET may be blown from the main stream of flakes with air jets. In various embodiments, the resulting level of non-PET flakes is less than 25 ppm.

In various embodiments, the system is adapted to ensure that the PET polymer being processed into filament is substantially free of water (e.g., entirely free of water). In a particular embodiment, the flakes are placed into a pre-conditioner for between about 20 and about 40 minutes (e.g., about 30 minutes) during which the pre-conditioner blows the surface water off of the flakes. In particular embodiments, interstitial water remains within the flakes. In various embodiments, these "wet" flakes (e.g., flakes comprising interstitial water) may then be fed into an extruder (e.g., as described below), which includes a vacuum setup designed to remove—among other things—the interstitial water that remains present in the flakes following the quick-drying process described above.

Using an Extrusion System to Melt and Purify PET Flakes

Figure 2:
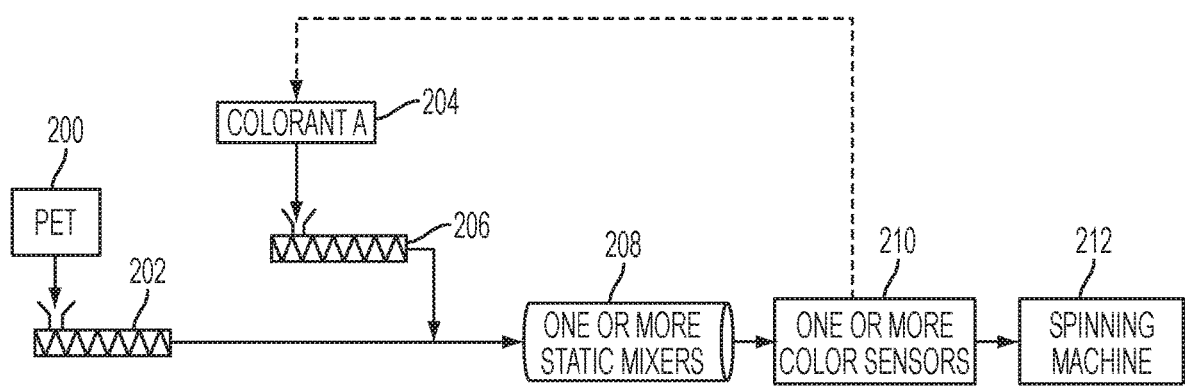
FIG. 2 depicts a process flow, according to a particular embodiment, for adding a colorant to a stream of molten polymer downstream from a first extruder.
Figure 3:
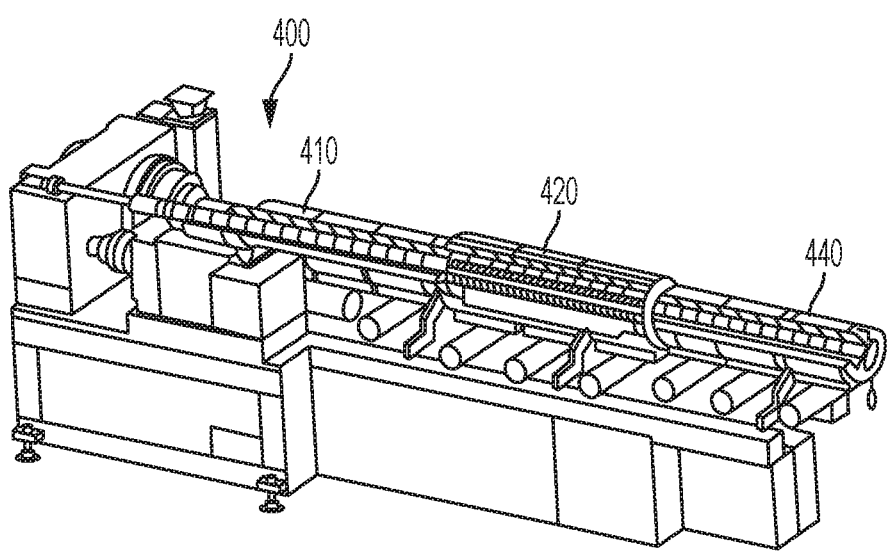
FIG. 3 is a perspective view of an MRS extruder that is suitable for use as the first extruder of FIG. 2.
Figure 4:
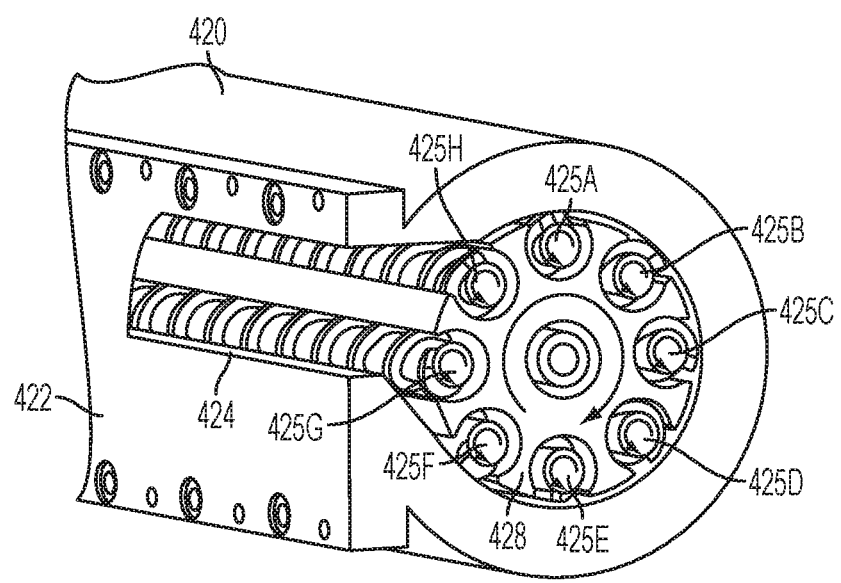
FIG. 4 is a cross-sectional view of an exemplary MRS section of the MRS extruder of FIG. 2.

FIG. 2 depicts an exemplary process flow for producing BCF with an added colorant according to a particular embodiments. As shown in FIG. 2, in various embodiments, a suitable primary extruder 202 is used to melt and purify PET 200, such as any suitable PET 200 prepared in any manner described above. In a particular embodiment, the primary extruder 202 comprises any suitable extruder such as, for example, a Multiple Rotating Screw ("MRS") extruder, a twin screw extruder, a multiple screw extruder, a planetary extruder, or any other suitable extrusion system. An exemplary MRS Extruder 400 is shown in FIGS. 3 and 4. A particular example of such an MRS extruder is described in U.S. Published Patent Application 2005/0047267, entitled "Extruder for Producing Molten Plastic Materials", which was published on Mar. 3, 2005, and which is hereby incorporated herein by reference.

As may be understood from FIGS. 3 and 4, in particular embodiments, the MRS extruder includes a first single-screw extruder section 410 for feeding material into an MRS section 420 and a second single-screw extruder section 440 for transporting material away from the MRS section.

As may be understood from FIG. 3, in various embodiments, PET is first fed through the MRS extruder's first single-screw extruder section 410, which may, for example, generate sufficient heat (e.g., via shearing) to at least substantially melt (e.g., melt) the wet flakes.

The resultant polymer melt (e.g., comprising the melted PET), in various embodiments, is then fed into the extruder's MRS section 420, in which the extruder separates the melt flow into a plurality of different streams (e.g., 4, 6, 8, or more streams) through a plurality of open chambers. FIG. 4 shows a detailed cutaway view of an MRS Section 420 according to a particular embodiment. In particular embodiments, such as the embodiment shown in this figure, the MRS Section 420 separates the melt flow into eight different streams, which are subsequently fed through eight satellite screws 425A-H. As may be understood from FIG. 3, in particular embodiments, these satellite screws are substantially parallel (e.g., parallel) to one other and to a primary screw axis of the MRS Machine 400.

As shown in FIG. 4, in particular embodiments: (1) the satellite screws 425A-H are arranged within a single screw drum 428 that is mounted to rotate about its central axis; and (2) the satellite screws 425A-H are configured to rotate in a direction that is opposite to the direction in which the single screw drum rotates 428. In various other embodiments, the satellite screws 425A-H and the single screw drum 428 rotate in the same direction. In particular embodiments, the rotation of the satellite screws 425A-H is driven by a ring gear. Also, in various embodiments, the single screw drum 428 rotates about four times faster than each individual satellite screw 425A-H. In certain embodiments, the satellite screws 425A-H rotate at substantially similar (e.g., the same) speeds.

In various embodiments, as may be understood from FIG. 4, the satellite screws 425A-H are housed within respective extruder barrels, which may, for example be about 30% open to the outer chamber of the MRS section 420. In particular embodiments, the rotation of the satellite screws 425A-H and single screw drum 428 increases the surface exchange of the polymer melt (e.g., exposes more surface area of the melted polymer to the open chamber than in previous systems). In various embodiments, the MRS section 420 creates a melt surface area that is, for example, between about twenty and about thirty times greater than the melt surface area created by a co-rotating twin screw extruder. In a particular embodiment, the MRS section 420 creates a melt surface area that is, for example, about twenty five times greater than the melt surface area created by a co-rotating twin screw extruder.

In various embodiments, the MRS extruder's MRS Section 420 is fitted with a vacuum pump that is attached to a vacuum attachment portion 422 of the MRS section 420 so that the vacuum pump is in communication with the interior of the MRS section via a suitable opening 424 in the MRS section's housing. In still other embodiments, the MRS Section 420 is fitted with a series of vacuum pumps. In particular embodiments, the vacuum pump is configured to reduce the pressure within the interior of the MRS Section 420 to a pressure that is between about 0.5 millibars and about 25 millibars. In particular embodiments, the vacuum pump is configured to reduce the pressure in the MRS Section 420 to less than about 5 millibars (e.g., about 1.8 millibars or less). The low-pressure vacuum created by the vacuum pump in the MRS Section 420 may remove, for example: (1) volatile organics present in the melted polymer as the melted polymer passes through the MRS Section 420; and/or (2) at least a portion of any interstitial water that was present in the wet flakes when the wet flakes entered the MRS Extruder 400. In various embodiments, the low-pressure vacuum removes substantially all (e.g., all) of the water and contaminants from the polymer stream.

In some embodiments, after the molten polymer is run the through the multi-stream MRS Section 420, the streams of molten polymer are recombined and flow into the MRS extruder's second single screw section 440. In particular embodiments, passage through the low pressure MRS Section 420 purifies the recycled polymer melt (e.g., by removing the contaminants and interstitial water) and makes the recycled polymer substantially structurally similar to (e.g., structurally the same as) pure virgin PET polymer. In particular embodiments, the resulting polymer is a recycled PET polymer (e.g., obtained 100% from post-consumer PET products, such as PET bottles or containers) having a polymer quality that is suitable for use in producing PET carpet filament using substantially only (e.g., only) PET from recycled PET products.

Step 2: Add a Colorant to the Polymer Melt Downstream from the Primary Extruder

In particular embodiments, after the recycled PET polymer (e.g., or virgin PET) has been extruded and purified by the above-described extrusion process, a colorant is added to the resultant polymer melt. As shown in FIG. 2, Colorant A 204 may be added to the polymer melt using a suitable secondary extruder 206. In various embodiments, the secondary extruder 206 may include any suitable extruder such as for example, any suitable single-screw extruder or other extruder described herein (e.g., a twin screw extruder, a multiple screw extruder, a planetary extruder, or any other suitable extrusion system). In particular embodiments, a suitable secondary extruder 206 may include, for example, an HPE-150 Horizontal Extruder manufactured by David-Standard, LLC of Pawcatuck, Conn.

In particular embodiments, Colorant A 204 may comprise pelletized color concentrate which the secondary extruder 208 is configured to at least partially melt prior to adding Colorant A 204 to the polymer melt. In various other embodiments, Colorant A 204 may comprise other additives such as, for example, a carrier resin which may aid in binding the colorant to the polymer. In other embodiments, Colorant A 204 may include any suitable liquid colorant which may be pumped into the polymer melt using any suitable pump (e.g., in lieu of using a secondary extruder 206 and pelletized color concentrate).

In various embodiments, the process may further include monitoring an amount of throughput (e.g., polymer output) from the primary extruder 202 in order to determine an appropriate amount of letdown (e.g., an appropriate let down ratio) such that a proper amount of Colorant A 204 is added to the polymer melt downstream from the primary extruder 202. In various embodiments, a desirable letdown ratio may include a letdown ration of between about two percent and about eight percent. In other embodiments, the letdown ratio may include any other suitable letdown ratio (e.g., one percent, two percent, three percent, four percent, five percent, six percent, seven percent, etc.). In particular embodiments, the letdown ratio may vary based on a desired color of bulked continuous filament ultimately produced using the process (e.g., up to about twenty percent).

In various embodiments, adding the colorant 204 downstream of the primary extruder 202 may save on waste during color changeover. For example, when switching between producing bulked continuous filament of a first color to producing bulked continuous filament of a second color, it is necessary to change the colorant 204 added to the polymer melt (e.g., from a first colorant that would result in bulked continuous filament of the first color to a second colorant that would result in bulked continuous filament of the second color). As may be understood by one skilled in the art, after switching from adding the first colorant to the polymer melt to adding the second colorant to the polymer melt, residual first colorant may remain in the system between the point in the process at which the colorant is added and the spinning machine 212. For example, residual first colorant may remain in the secondary extruder 206, the one or more static mixers 208, or any other physical mechanism used in the process (such as any mechanism shown in FIG. 2) or any piping or tubing which connects the various components of the system.

As may be understood by one skilled in the art, after running the process with the second colorant for a suitable amount of time, the bulked continuous filament produced by the process will eventually be of the second, desired color (e.g., because the first colorant will eventually be substantially flushed out the system). Between the point at which there is a changeover in adding the second colorant to the process rather than the first colorant and the point at which the process begins to produce the desired color of bulked continuous filament, the process will produce some waste bulked continuous filament that is of an undesired color (e.g., due at least in part to the residual first colorant).

In various embodiments, the waste bulked continuous filament produced using the process described herein may be considerably lower than waste bulked continuous filament produced during color changeovers using other processes (e.g., such as other processes in which colorant is added to PET prior to extrusion in a primary extruder such as an MRS extruder). For example, in various embodiment, the process described herein may limit waste bulked continuous filament to an amount of bulked continuous filament produced when running a single package of colorant (e.g., of the second colorant), which may, for example, result in less than about 100 pounds of waste. In particular embodiments, reducing waste may lead to cost saving in the production of bulked continuous filament.

Step 3: Use One or More Static Mixers to Mix Polymer Melt with Added Colorant

Figure 5:
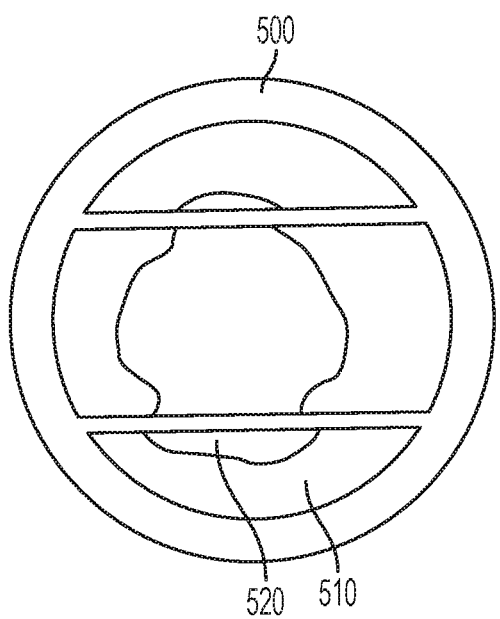
FIG. 5 is a cross-sectional end view of dispersion of a colorant in a stream of molten polymer prior to passing through the one or more static mixers shown in FIG. 2.
Figure 6:
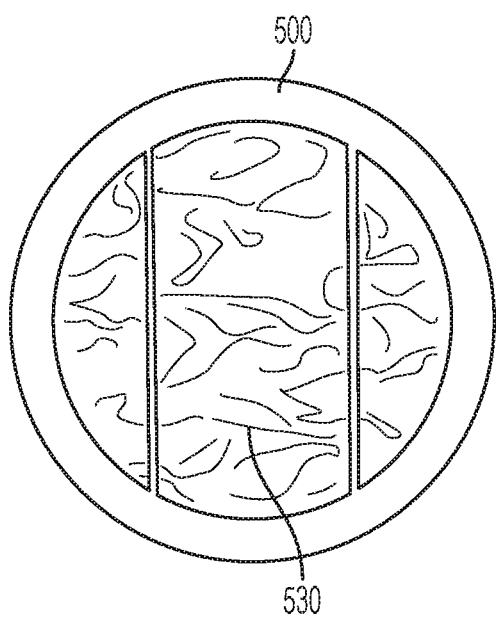
FIG. 6 is a cross-sectional end view of dispersion of a colorant in a stream of molten polymer following passing through the one or more static mixers shown in FIG. 2.

In particular embodiments, following the addition of Colorant A 204 to the stream of molten polymer, the process includes the use of one or more static mixers 208 (e.g., one or more static mixing elements) to mix and disperse Colorant A 204 throughout the polymer stream. As may be understood by one skilled in the art, due in part to the viscosity of the polymer stream (e.g., polymer melt), when a dye or other colorant is added to the polymer stream, the dye and the stream may not mix. In various embodiments, the flow of the polymer melt is substantially laminar (e.g., laminar) which may, for example, further lead to a lack of mixing. FIG. 5 depicts a cross section view of a pipe 500 containing a polymer melt 510 into which a liquid colorant 520 has been added. As shown in this Figure, the liquid colorant 520 has not mixed with the polymer melt 510. Generally speaking, the unmixed polymer melt 510 and colorant 520 may not be suitable for forming into bulked continuous filament (e.g., because the resulting filament may not have a consistent, uniform color). FIG. 6 depicts the pipe 500 of FIG. 5 in which the liquid colorant 520 and the polymer melt 510 have been substantially thoroughly (e.g., uniformly) mixed into a colored melt stream 530. This substantially uniform mixing, in various embodiments, is achieved through the use of the one or more static mixers 208 as shown in FIG. 2. Generally speaking, this uniformly mixed colored melt stream 530 shown in FIG. 5 may be far more suitable for producing uniformly colored bulked continuous filament.

Figure 7:
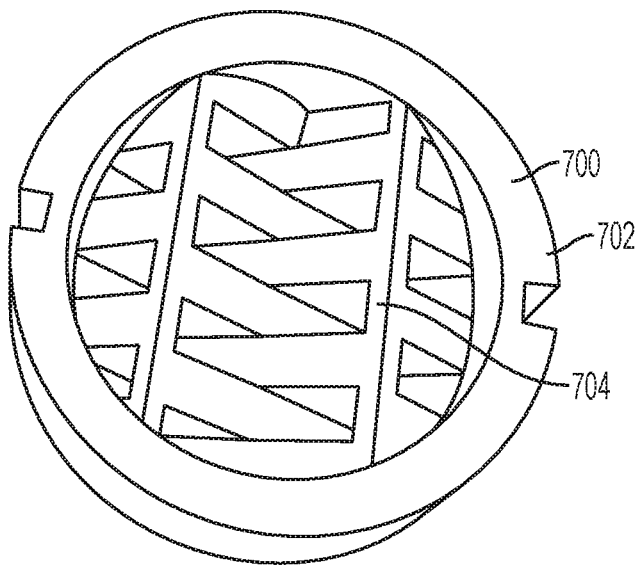
FIG. 7 is a cross-sectional end view of the exemplary one of the one or more static mixers of FIG. 2, according to a particular embodiment.

FIG. 7 depicts an exemplary static mixer 700 which may, in various embodiments, be utilized in the achievement of substantially uniform (e.g., uniform) mixing of the polymer melt and the added colorant (e.g., Colorant A 204 from FIG. 2). As may be understood from this Figure, a static mixer 700 may comprise a housing 702 (e.g., a substantially circular or cylindrical housing) and be inserted into a pipe or other housing (e.g., incorporated into a pipe or other housing). In the embodiment shown in this Figure, the static mixer 700 comprises a plurality of mixing bars 704 (e.g., static mixing elements) disposed within the housing 702. In particular embodiments, the static mixer 700 creates mixing by directing two or more viscous materials to follow the geometric structure of the mixing bars 704 disposed within the static mixer housing 702 that continuously divide and recombine the flow. In various embodiments, a very high degree of mixing may be achieved over a short length of static mixers. In particular embodiments, the static mixer 700 comprises no moving parts and is made of any suitable material such as, for example high strength heat treated stainless steel, a suitable plastic, or any other suitable material.

Figure 8:
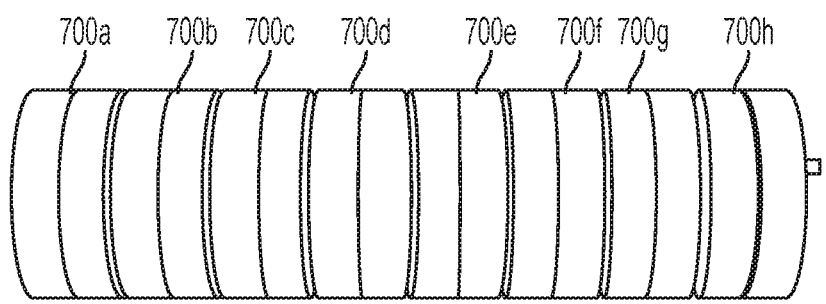
FIG. 8 is a side view of eight of the exemplary static mixers of FIG. 7 coupled to one another.

In particular embodiments, the one or more static mixers 208 shown in FIG. 2 comprise any suitable static mixer, such as, for example, a Stamixco GXR 40/50 or GXR 52/60 made by Stamixco LLC of Brooklyn, N.Y. A suitable mixing element for use as a static mixer is described in U.S. Pat. No. 8,360,630 B2, entitled "Mixing Elements for a Static Mixer and Process for Producing Such a Mixing Element" and published on Jan. 29, 2013, which is hereby incorporated herein in its entirety. In other embodiments, the one or more static mixers 208 may comprise any other suitable static mixer having a suitable arrangement of mixing bars for dispersing the colorant throughout the polymer melt. In particular embodiments, the one or more static mixers 208 comprise a plurality of individual static mixers 700 (e.g., static mixing elements) such as is shown in FIG. 8. FIG. 8 depicts eight static mixers 700a-h coupled to one another. In other embodiments, the one or more static mixers may comprise any suitable number of individual static mixers (e.g., up to 36 static mixers). In other embodiments, one or more static mixers may comprise any number of static mixing elements. In particular embodiments, the individual static mixers 700 may be oriented in any suitable direction relative to one another (e.g., oriented randomly relative to one another when coupled to one another as shown in FIG. 8).

Figure 9:
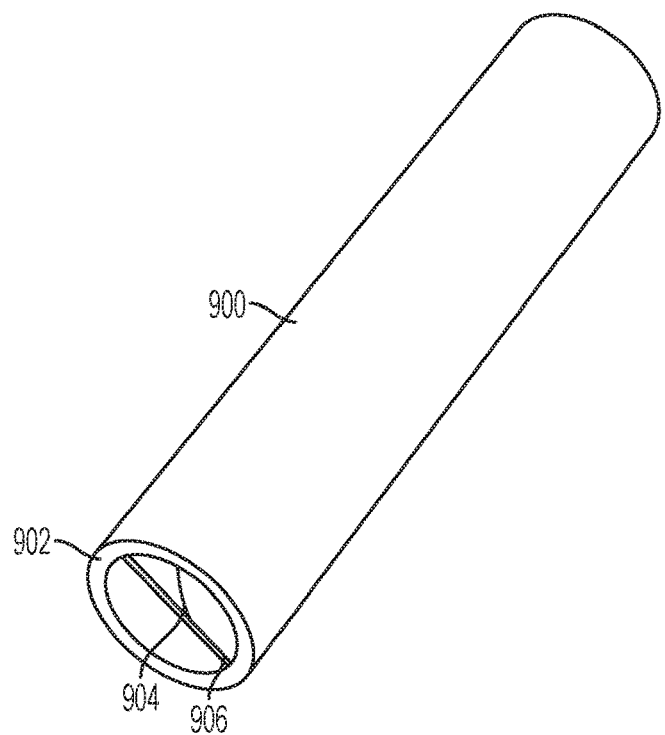
FIG. 9 is a perspective view of an exemplary helical static mixer according to a particular embodiment.

In various other embodiments, the one or more static mixers 208 may comprise a suitable static mixer comprising one or more suitable helical mixing elements. FIG. 9 depicts an exemplary helical static mixer 900 comprising a substantially cylindrical (e.g., cylindrical) housing 902 in which at least one helical mixing element 904 is disposed). As shown in this Figure, the at least one helical mixing element 904 defines a leading edge 906 that extends between opposing interior portions of the cylindrical housing (e.g., along a diameter of the cylindrical housing). In various embodiments, the leading edge 906 is substantially planar (e.g., linear) and has any suitable thickness. As may be understood from this Figure, the leading edge 906 may divide (e.g., bisect) a polymer melt flowing into the helical static mixer 900 into two streams (e.g., a first stream on a first side of the leading edge 906 and a second stream on a second side). In particular embodiments, the leading edge may divide the flow into substantially equal streams as material passes the helical mixing element 904.

Figure 10:
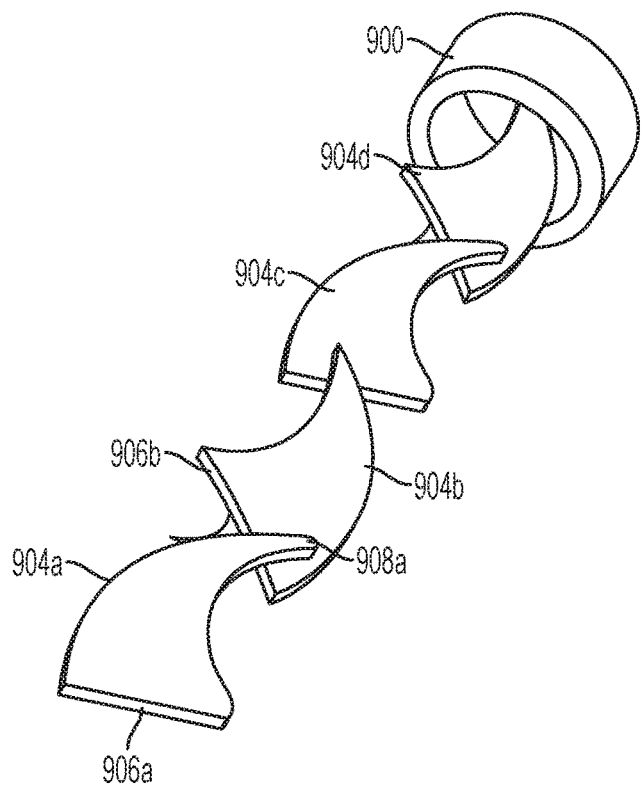
FIG. 10 is a perspective cutaway view of the helical static mixer of FIG. 9 showing four helical static mixing components.

FIG. 10 depicts the helical static mixer 900 of FIG. 9 in a cutaway view that shows four helical mixing elements 904 disposed within the housing 902. As may be further understood from FIG. 10, each individual helical mixing element 904 (e.g., helical mixing element 904a) comprises a substantially rectangular (e.g., rectangular) plate defining a leading edge 906a and a trailing edge 908a that has been twisted about 180 degrees (e.g., 180 degrees). As shown in this Figure, the leading edge 906a and trailing edge 908a are substantially parallel (e.g., parallel) to one another and the helical mixing element 904a extends between the leading edge 906a and trailing edge 908a in a helical pattern. Although in the embodiment shown in this Figure, the helical mixing element 904a is shown having a twist of 180 degrees between the leading edge 906a and trailing edge 908a, it should be understood that in various other embodiments, each individual helical mixing element 904 may comprise any other suitable helical shape or portion thereof. For example, in particular embodiments, the helical mixing element 904 may comprise a substantially rectangular plate defining a leading edge 906 and a trailing edge 908 that has been twisted any other suitable amount between zero and 360 degrees (e.g., 45 degrees, 90 degrees, 270 degrees, etc.) In still other embodiments, the helical mixing element 904 may have any suitable length relative to its diameter.

As may be further understood from FIG. 10, in various embodiments, each particular helical mixing element 904a-d is disposed within the housing 902 at an angle to an adjacent helical mixing element 904. For example, helical mixing element 904a is disposed such that a trailing edge 908a of helical mixing element 904a forms an angle with the leading edge 906b of helical mixing element 906b. In particular embodiments, the trailing edge 908a and leading edge 906b of adjacent helical mixing elements 904 may form any suitable angle with one another. In particular embodiments, the trailing edge 908a and leading edge 906b of adjacent helical mixing elements 904 may form an angle of between about zero degrees and about ninety degrees with one another. In particular embodiments, the trailing edge 908a and leading edge 906b of adjacent helical mixing elements 904 may at least partially abut one another and be substantially co-facing (e.g., co-facing). In particular embodiments, the trailing edge 908a and leading edge 906b of adjacent helical mixing elements 904 may form a particular angle between one another (e.g., zero degrees, ninety degrees, forty-five degrees, or any other suitable angle). A suitable helical static mixer for use in the above-described process may include, for example, the any suitable helical static mixture manufactured by JLS International of Charlotte, N.C.

In particular embodiments, the one or more static mixers 208 may comprise any suitable number and combination of any suitable static mixing element descried herein. For example, in particular embodiments, the one or more static mixers 208 comprise up to thirty six individual static mixing elements (e.g., thirty six static mixing elements, thirty four static mixing elements, etc.). In still other embodiments, the one or more static mixers 208 comprise any other suitable number of static mixing elements sufficient to substantially uniformly (e.g., homogeneously) mix the molten polymer with the added colorant (e.g., to substantially uniformly mix the molten polymer and the added colorant into a colored melt stream 530 as shown in FIG. 6). This may include, for example, up to 40 static mixing elements, or any other suitable number).

In particular emboldens, the one or more static mixers 208 may comprise any suitable combination of static mixing elements (e.g., types of static mixers), such as, for example, any suitable break down of the static mixer 700 shown in FIG. 7 and the helical static mixer 900 or helical mixing elements 904 shown in FIGS. 9 and 10. For example, in a particular embodiment, the one or more static mixers 208 may comprise thirty six helical mixing elements 904. In another embodiments, the one or more static mixers 208 may comprise thirty six static mixers 700 from FIG. 7. In various embodiments, the one or more static mixers 208 may comprise any suitable number of alternating static mixers 700 shown in FIG. 7 and helical mixing elements 904 shown in FIGS. 9 and 10. In various other embodiments, the one or more static mixers 208 may comprise up to forty (e.g., up to thirty six) individual static mixing elements comprising up to forty (e.g., up to thirty six) of the static mixers 700 shown in FIG. 7 and balance helical mixing elements 904 shown in FIGS. 9 and 10. In such embodiments, the static mixers 700 from FIG. 7 and the helical mixing elements 904 may be arranged in any suitable order (e.g., a specific order, a random order, a pattern such as a repeating pattern, etc.).

Step 4: Use of a Spinning Machine to Turn the Colored Polymer into Filament

Referring back to FIG. 2, after the polymer melt and the added colorant have been sufficiently mixed using the one or more static mixers 208 (e.g., homogeneously mixed), the resultant colored melt stream may be fed directly into a BCF (or "spinning") machine 212 that is configured to turn the molten polymer into bulked continuous filament (See FIG. 2). In particular embodiments, the spinning machine 212 extrudes molten polymer through small holes in a spinneret in order to produce carpet yarn filament from the polymer. In particular embodiments, the molten recycled PET polymer cools after leaving the spinneret. The carpet yarn is then taken up by rollers and ultimately turned into filaments that are used to produce carpet. In various embodiments, the carpet yarn produced by the spinning machine 212 may have a tenacity between about 3 gram-force per unit denier (gf/den) and about 9 gf/den. In particular embodiments, the resulting carpet yarn has a tenacity of at least about 3 gf/den.

In particular embodiments, the spinning machine 212 used in the process described above is the Sytec One spinning machine manufactured by Oerlika Neumag of Neumuenster, Germany. The Sytec One machine may be especially adapted for hard-to-run fibers, such as nylon or solution-dyed fibers, where the filaments are prone to breakage during processing. In various embodiments, the Sytec One machine keeps the runs downstream of the spinneret as straight as possible, uses only one threadline, and is designed to be quick to rethread when there are filament breaks.

Although the example described above describes using the Sytec One spinning machine to produce carpet yarn filament from the polymer, it should be understood that any other suitable spinning machine may be used. Such spinning machines may include, for example, any suitable one-threadline or three-threadline spinning machine made by Oerlika Neumag of Neumuenster, Germany or any other company.

In various embodiments, prior to using the spinning machine 212 to spin the colored melt into filament, the process may utilize one or more color sensors 210 to determine a color of the colored melt. In various embodiments, the one or more color sensors 210 comprises one or more spectrographs configured to separate light shone through the polymer melt into a frequency spectrum to determine the color of the polymer melt. In still other embodiments, the one or more color sensors 210 comprises one or more cameras or other suitable imaging devices configured to determine a color of the resultant polymer melt. In particular embodiments, in response to determining that the color of the polymer melt is a color other than a desired color (e.g., the polymer melt is lighter than desired, darker than desired, a color other than the desired color, etc.) the system may: (1) discard the portion of the stream with the incorrect color; and/or (2) adjust an amount of colorant 204 that is added to the flake and/or the polymer melt upstream in order to adjust a color of the resultant polymer melt. In particular embodiments, adjusting the amount of colorant 204 is executed in a substantially automated manner (e.g., automatically) using the one or more color sensors 210 in a computer-controlled feedback control loop.

Figure 11:
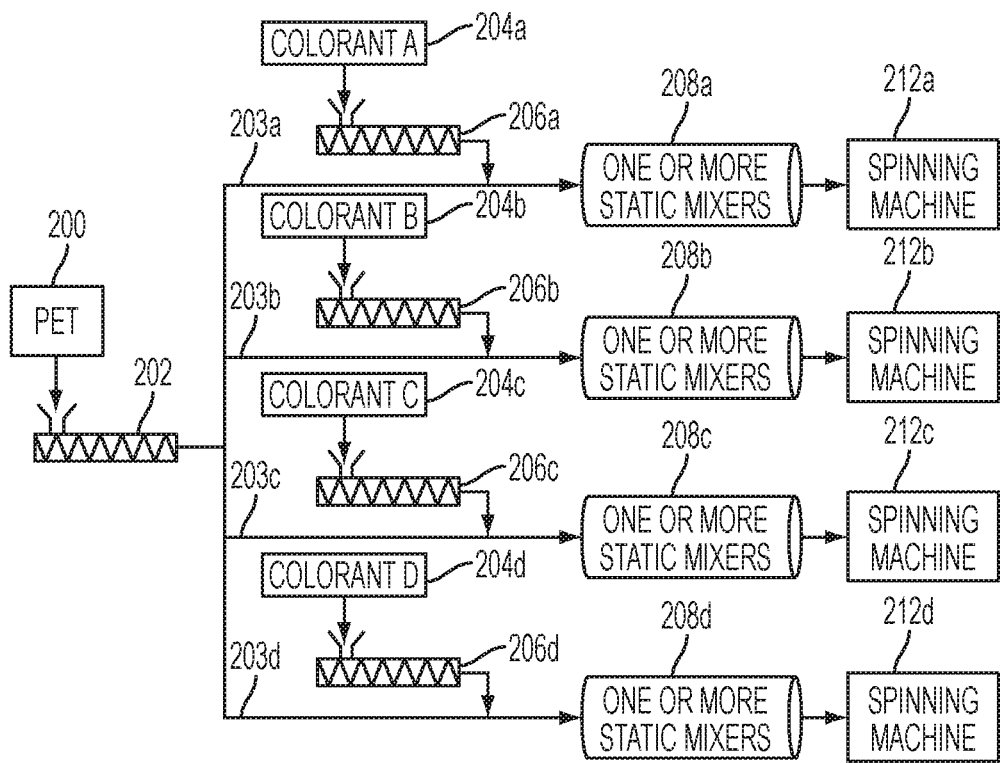
FIG. 11 depicts a process flow, according to a particular embodiment, for adding various colorants to several streams of molten polymer downstream from a first extruder.

Producing a Plurality of Different Colored Fibers Using a Single Primary Extruder In addition to the single colorant added to a single polymer stream from a primary extruder 202 described above with respect to FIG. 2, the process described herein may be utilized to produce a plurality of different colored filament from a single primary extruder. FIG. 11 depicts a process for producing a plurality of different colored filament from a single primary extruder (e.g., a single MRS extruder) according to a particular embodiment. As may be understood from FIG. 11, the process involves splitting the polymer melt from the primary extruder 202 into a plurality of individual polymer streams 203*a-d* (e.g., four individual polymer streams) using any suitable technique. In other embodiments, the process may include splitting the polymer melt from the primary extruder 202 into any suitable number of individual polymer streams (e.g., two individual polymer streams, three individual polymer streams, four individual polymer streams, five individual polymer streams, six individual polymer streams, seven individual polymer streams, eight individual polymer streams, etc.)

As shown in this Figure, a colorant (e.g., Colorant A-D 204*a-d*) is added to each individual polymer stream, for example, using a respective extruder 206*a-d* as described above. For example, Colorant C 204 is added to individual polymer stream 203*c* using extruder 206*c*.

Once the respective Colorant A-D 204*a-d* has been added to the respective individual polymer stream 203*a-d*, each individual polymer stream 203*a-d* with added Colorant A-D 204*a-d* is substantially uniformly mixed using respective one or more static mixers 208*a-d*. For example, once Colorant D 204*d* has been added to individual polymer stream 203*d*, the resultant colorant/polymer mixture passes through the one or more static mixers 208*d* to mix the Colorant D 204*d* and individual polymer stream 203*d* (e.g., to substantial homogeneity). Following mixture by the one or more static mixers 208*a-d*, the resultant respective colored melt streams are spun into filament using respective spinning machines 212*a-d*.

In various embodiments, it may be important to monitor the output of the extruder to determine a throughput of each individual polymer stream 203a-d. In such embodiments, monitoring throughput may ensure that each individual polymer stream 203a-d has the proper color letdown ratio in order to add a proper amount of Colorant A-D 204a-d to achieve a desired color of bulked continuous filament.

As may be understood from FIG. 11, splitting extruded polymer from a primary extruder 202 into a plurality of polymer streams 203a-d prior to the addition of colorant may enable the production of a plurality of colored filament using a single primary extruder 202. Furthermore, by using a plurality of different colorants and extruders downstream of the primary extruder 202, the process may facilitate a reduction in waste when changing a colorant used. For example, when using a single extruder in which color is added upstream of the extruder, there is waste associated with changing over a color package in that the extruder must run sufficiently long between changes to ensure that all of the previous color has cleared the extruder (e.g., such that none of the previous color will remain and mix with the new color). In some embodiments, the wasted filament as a result of a switch in color may include up to several thousand pounds of filament (e.g., up to 4000 pounds). Using a smaller secondary extruder 206a-d to introduce colorant to the various individual polymer streams 203a-d downstream from the primary extruder 202 may reduce (e.g., substantially reduce) the amount of waste associated with a changeover of colorant (e.g., to below about 100 pounds per changeover).

Alternative Embodiments

Various embodiments of a process for producing various colored bulked continuous filament may include features that vary from or are in addition to those described above. Exemplary alternative embodiments are described below.

Addition of Liquid Colorant to Melt Stream Using Pump

Figure 12:
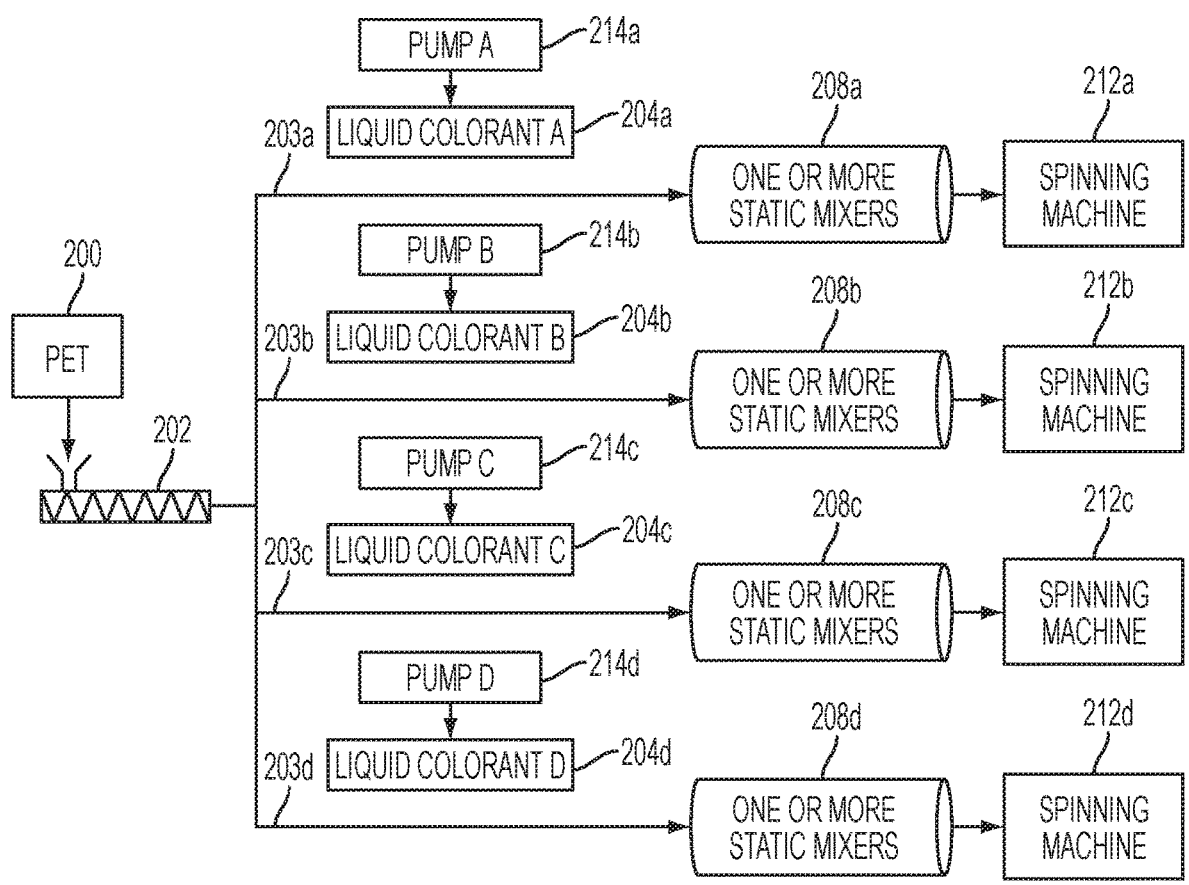
FIG. 12 depicts a process flow, according to another embodiment, for adding various colorants to several streams of molten polymer downstream from a first extruder.

FIG. 12 depicts an alternative process flow for that, in many respects is similar to the process flow shown in FIG. 11. In the embodiment shown in FIG. 12, however, liquid colorant 214a-d is added to the individual polymer streams 203a-d using a pump 214a-d rather than an extruder. In various embodiments, using a liquid colorant may have the benefit of additional cost saving due to not having to use any additional secondary extruders (e.g., which may have a greater initial cost outlay than a pump, greater running costs than a pump, etc.). In particular embodiments in which a pump 214a-d is used to inject the liquid colorant 214a-d into the individual polymer streams 203a-d, the process may further include exchanging a hose used to connect the pump 214a-d to the individual polymer streams 203a-d when exchanging a particular liquid colorant (e.g., liquid colorant 204a) for a different liquid colorant (e.g., a liquid colorant of a different color). By exchanging the hose when exchanging colorants, waste may further be reduced in that the replacement hose is pre-purged of any residual colorant of the previous color.

Conclusion

Many modifications and other embodiments of the invention will come to mind to one skilled in the art to which this invention pertains having the benefit of the teachings presented in the foregoing descriptions and the associated drawings. Also, while various embodiments are discussed above in regard to producing carpet filament from PET, similar techniques may be used to produce carpet filament from other polymers. Similarly, while various embodiments are discussed above in regard to producing carpet filament from PET, similar techniques may be used to produce other products from PET or other polymers.

In addition, it should be understood that various embodiments may omit any of the steps described above or add additional steps. Furthermore, any numerical ranges described herein are intended to capture every integer and fractional value within the described range (e.g., every rational number value within the described range). For example, it should be understood that a range describing a letdown ration of between about two percent and about eight percent is intended to capture and disclose every rational number value percentage between two percent and eight percent (e.g., 2%, 3%, 4%, 5%, 6%, 7%, 8%, 2.1%, 2.01%, 2.001% . . . 7.999% and so on). Additionally, terms such as 'about', 'substantially', etc., when used to modify structural descriptions or numerical values are intended to capture the stated shape, value, etc. as well as account for slight variations as a result of, for example, manufacturing tolerances. For example, the term 'substantially rectangular' is intended to describe shapes that are both exactly rectangular (e.g., have four sides that meet at ninety degree angles) as well as shapes that are not quite exactly rectangular (e.g., shapes having four sides that meet at an angle in an acceptable tolerance of ninety degrees, such as 90°+/−4°)

In light of the above, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

What is claimed is:

1. A method of manufacturing a plurality of colors of bulked continuous carpet filament from polyethylene terephthalate (PET) using a single multi-screw extruder, the method comprising:
   (A) providing a multi-screw extruder;
   (B) using the multi-screw extruder to:
      (i) at least partially melt the PET into a first polymer melt,
      (ii) split the first polymer melt into a first plurality of individual polymer streams within the multi-screw extruder,
      (iii) at least partially purify the first plurality of individual polymer streams within the multi-screw extruder, and
      (iv) combine the first plurality of individual polymer streams into a second polymer melt;
   (C) after the step of using the multi-screw extruder to at least partially melt the PET into the first polymer melt and at least partially purify the first polymer melt, splitting the second polymer melt into a second plurality of individual polymer streams downstream from the multi-screw extruder;
   (D) providing, for each of the second plurality of individual polymer streams, a respective secondary extruder, wherein each secondary extruder is an extruder selected from a group consisting of:
      (a) a single screw extruder;
      (b) a twin screw extruder;
      (c) a multiple screw extruder; and
      (d) a planetary extruder;
   (E) using each respective secondary extruder to add a respective colorant to each of the second plurality of individual polymer streams;
   (F) providing, for each of the second plurality of individual polymer streams, one or more respective static mixers, each of the one or more respective static mixers comprising a substantially cylindrical housing and at least thirty individual static mixing elements disposed within the substantially cylindrical housing;

(G) after the step of using each respective secondary extruder to add a respective colorant to each of the second plurality of individual polymer streams, using the one or more respective static mixers to substantially thoroughly mix each of the second plurality of individual polymer streams with the respective colorant; and (F) after the step of using the one or more respective static mixers to substantially thoroughly mix each of the second plurality of individual polymer streams with the respective colorant, forming each of the second plurality of individual polymer streams into bulked continuous carpet filament.

2. The method of claim 1, the method further comprising:
providing, for each of the second plurality of individual polymer streams, a respective spinning machine; and
forming each of the second plurality of individual polymer streams into bulked continuous carpet filament using each the respective spinning machine to form each of the second plurality of individual polymer streams into the bulked continuous carpet filament.

3. The method of claim 1, wherein the respective at least thirty individual static mixing elements of at least one of the one or more static mixers comprise helical static mixing elements configured longitudinally about a central longitudinal axis of the respective substantially cylindrical housing.

4. The method of claim 3, wherein:
the at least one helical static mixing element comprises a substantially rectangular plate defining a leading edge that extends diametrically between opposing interior portions of the substantially cylindrical housing and a trailing edge that extends diametrically between opposing interior portions of the substantially cylindrical housing; and
the substantially rectangular plate extends helically within the substantially cylindrical housing from the leading edge to the trailing edge such that the substantially rectangular plate is twisted about 180 degrees between the leading edge and the trailing edge.

5. The method of claim 4, wherein:
the at least one helical static mixing element is a first helical mixing element;
the at least thirty individual static mixing elements comprise a second helical static mixing element, wherein the second helical static mixing element is substantially structurally identical to the first helical static mixing element; and
the second helical static mixing element is disposed adjacent the first static mixing element within the substantially cylindrical housing such that:
the trailing edge of the first helical static mixing element abuts at least a portion of the leading edge of the second helical static mixing element; and
the trailing edge of the first helical static mixing element forms an angle with the leading edge of the second helical static mixing element of between about zero degrees and about ninety degrees.

6. The method of claim 5, wherein the trailing edge of the first helical static mixing element forms an angle with the leading edge of the second helical static mixing element of about ninety degrees.

7. The method of claim 1, wherein the at least thirty individual static mixing elements comprises at least one static mixing element comprising:

a plurality of substantially rectangular mixing bars disposed within the substantially cylindrical housing.

8. The method of claim 7, wherein, the at least thirty individual static mixing elements comprise thirty static mixing elements each comprising a plurality of substantially rectangular mixing bars disposed within the substantially cylindrical housing.

9. The method of claim 8, wherein:
the at least thirty static mixing elements are structurally identical;
the at least thirty static mixing elements comprise a first static mixing element and a second static mixing element;
the first static mixing element is disposed adjacent the second static mixing element;
the first static mixing element is disposed in a first orientation relative to the at least thirty individual static mixing elements; and
the second static mixing element is disposed in an orientation other than the first orientation.

10. The method of claim 1, wherein the at least thirty individual static mixing elements comprise thirty six individual static mixing elements.

11. The method of claim 1, wherein:
the second plurality of individual polymer streams comprises a first individual polymer stream; and
the method further comprises:
providing a first secondary extruder;
using the first secondary extruder to add a first colorant to the first individual polymer stream;
providing, for the first individual polymer stream, one or more first static mixers;
using the one or more first static mixers to substantially thoroughly mix the first individual polymer stream and the first colorant;
forming the first individual polymer stream into bulked continuous filament of a first color;
changing the first colorant to a second colorant;
using the one or more first static mixers to substantially thoroughly mix the first individual polymer stream and the second colorant; and
forming the first individual polymer stream into bulked continuous filament of a second color.

12. The method of claim 11, wherein:
the method produces waste bulked continuous filament when changing the first colorant to the second colorant at least as a result of residual first colorant in the first secondary extruder; and
the waste bulked continuous filament is less than about one hundred pounds of bulked continuous filament.

13. A method of manufacturing at least four colors of bulked continuous carpet filament from polyethylene terephthalate (PET) using a single multi-screw extruder, the method comprising:
(A) providing a multi-screw extruder;
(B) using the multi-screw extruder to:
(i) at least partially melt the PET into a first polymer melt,
(ii) split the first polymer melt into a plurality of individual polymer streams within the multi-screw extruder,
(iii) at least partially purify the plurality of individual polymer streams within the multi-screw extruder, and
(iv) combine the plurality of individual polymer streams into a second polymer melt;

(C) after the step of using the multi-screw extruder to at least partially melt the PET into the first polymer melt and at least partially purify the first polymer melt, splitting the second polymer melt into at least four individual polymer streams downstream from the multi-screw extruder;
(D) providing, for each of the at least four individual polymer streams, a respective secondary extruder, wherein each secondary extruder is an extruder selected from a group consisting of:
(a) a single screw extruder;
(b) a twin screw extruder;
(c) a multiple screw extruder; and
(d) a planetary extruder;
(E) using each respective secondary extruder to add a respective colorant to each of the at least four individual polymer streams;
(F) providing, for each of the at least four individual polymer streams, one or more respective static mixers, each of the one or more respective static mixers comprising a substantially cylindrical housing and at least thirty six individual static mixing elements disposed within the substantially cylindrical housing;
(G) after the step of using each respective secondary extruder to add a respective colorant to each of the at least four individual polymer streams, using the one or more respective static mixers to substantially uniformly mix each of the at least four individual polymer streams with the respective colorant; and
(F) after the step of using the one or more respective static mixers to substantially thoroughly mix each of the plurality of individual polymer streams with the respective colorant, forming each of the at least four individual polymer streams into bulked continuous carpet filament.

14. The method of claim 13, wherein the method further comprises:
after the step of using the multi-screw extruder to at least partially melt the PET into the first polymer melt and at least partially purify the first polymer melt, splitting the second polymer melt into at least six individual polymer streams downstream from the multi-screw extruder;
providing, for each of the at least six individual polymer streams, a respective secondary extruder;
using each respective secondary extruder to add a respective colorant to each of the at least six individual polymer streams;
providing, for each of the at least six individual polymer streams, one or more respective static mixers, each of the one or more respective static mixers comprising a substantially cylindrical housing and at least thirty six individual static mixing elements disposed within the substantially cylindrical housing;
after the step of using each respective secondary extruder to add a respective colorant to each of the at least six individual polymer streams, using the one or more respective static mixers to substantially uniformly mix each of the at least six individual polymer streams with the respective colorant; and
after the step of using the one or more respective static mixers to substantially thoroughly mix each of the plurality of individual polymer streams with the respective colorant, forming each of the at least six individual polymer streams into bulked continuous carpet filament.

15. The method of claim 14, wherein the PET comprises recycled PET.

16. The method of claim 15, wherein the at least thirty six individual static mixing elements comprise a first static mixing element of a first type and a second static mixing element of a second type.

17. The method of claim 16, wherein the first static mixing element of the first type comprises a helical mixing element configured longitudinally about a central longitudinal axis of a first substantially cylindrical housing of the first static mixing element.

18. A method of manufacturing at least four colors of bulked continuous carpet filament from recycled polyethylene terephthalate (PET) bottles using a single multi-screw extruder:
(A) providing a plurality of recycled PET bottles
(B) grinding the plurality of recycled PET bottles into a group of polymer flakes, the group of flakes comprising a first plurality of flakes that consist essentially of PET and a second plurality of flakes that do not consist essentially of PET;
(C) washing the group of polymer flakes to remove at least a portion of one or more contaminants from a surface of the polymer flakes;
(D) after the step of washing the first plurality of flakes:
(i) scanning the washed group of flakes to identify the second plurality of flakes,
(ii) separating the second plurality of flakes from the first plurality of flakes;
(E) providing a multi-screw extruder that comprises:
(i) a first satellite screw extruder, the first satellite screw extruder comprising a first satellite screw that is mounted to rotate about a central axis of the first satellite screw;
(ii) a second satellite screw extruder, the second satellite screw extruder comprising a second satellite screw that is mounted to rotate about a central axis of the second satellite screw;
(iii) a third satellite screw extruder, the third satellite screw extruder comprising a third satellite screw that is mounted to rotate about a central axis of the third satellite screw;
(iv) a fourth satellite screw extruder, the fourth satellite screw extruder comprising a fourth satellite screw that is mounted to rotate about a central axis of the fourth satellite screw; and
(v) a pressure regulation system that is adapted to maintain a pressure within the first, second, third, and fourth satellite screw extruders between about 0 millibars and about 5 millibars,
(F) using the pressure regulation system to reduce a pressure within the first, second, third, and fourth satellite screw extruders to between about 0 millibars and about 5 millibars;
(G) using the multi-screw extruder to at least partially melt the first plurality of flakes into a first polymer melt and at least partially purify the first polymer melt by, while maintaining the pressure within the first, second, third, and fourth satellite screw extruders between about 0 millibars and about 5 millibars, passing the first polymer melt through the multi-screw extruder so that:
(1) a first portion of the first polymer melt passes through the first satellite screw extruder, (2) a second portion of the first polymer melt passes through the second satellite screw extruder, (3) a third portion of the first polymer melt passes through the third satellite screw extruder, and (4) a fourth portion of the first polymer melt passes through the fourth satellite screw extruder;

(H) after the step of using the multi-screw extruder to at least partially melt the first plurality of flakes into the first polymer melt and at least partially purify the first polymer melt, combining the first portion of the first polymer melt, the second portion of the first polymer melt, the third portion of the first polymer melt, and the fourth portion of the first polymer melt into a second polymer melt;

(I) after the step of combining the first portion of the first polymer melt, the second portion of the first polymer melt, the third portion of the first polymer melt, and the fourth portion of the first polymer melt into the second polymer melt, splitting the second polymer melt into at least four individual polymer streams downstream from the multi-screw extruder, the at least four individual polymer streams comprising a first polymer stream, a second polymer stream, a third polymer stream, and a fourth polymer stream;

(J) providing, for each of the first polymer stream, the second polymer stream, the third polymer stream, and the fourth polymer stream, a respective secondary extruder, wherein each secondary extruder is an extruder selected from a group consisting of:
(1) a single screw extruder;
(2) a twin screw extruder;
(3) a multiple screw extruder; and
(4) a planetary extruder;

(K) using each respective secondary extruder to add a first colorant to the first polymer stream, a second colorant to the second polymer stream, a third colorant to the third polymer stream, and a fourth colorant to the fourth polymer stream;

(L) providing, for the first polymer stream, one or more first static mixers comprising at least 36 first static mixing elements;

(M) providing, for the second polymer stream, one or more second static mixers comprising at least 36 second static mixing elements;

(N) providing, for the third polymer stream, one or more third static mixers comprising at least 36 third static mixing elements;

(O) providing, for the fourth polymer stream, one or more fourth static mixers comprising at least 36 fourth static mixing elements;

(P) after the step of adding the first colorant to the first polymer stream, using the one or more first static mixers to substantially mix the first polymer stream with the first colorant;

(Q) after the step of adding the second colorant to the second polymer stream, using the one or more second static mixers to substantially mix the second polymer stream with the second colorant;

(R) after the step of adding the third colorant to the third polymer stream, using the one or more third static mixers to substantially mix the third polymer stream with the third colorant;

(S) after the step of adding the fourth colorant to the fourth polymer stream, using the one or more fourth static mixers to substantially mix the fourth polymer stream with the fourth colorant;

(T) providing a first spinning machine, a second spinning machine, a third spinning machine, and a fourth spinning machine;

(U) after the step of using the one or more first static mixers to substantially mix the first polymer stream with the first colorant, forming the first polymer stream into a first colored bulked continuous carpet filament using the first spinning machine to form the first polymer stream into the first colored bulked continuous carpet filament;

(V) after the step of using the one or more second static mixers to substantially mix the second polymer stream with the second colorant, forming the second polymer stream into a second colored bulked continuous carpet filament using the second spinning machine to form the second polymer stream into the second colored bulked continuous carpet filament;

(W) after the step of using the one or more third static mixers to substantially mix the third polymer stream with the third colorant, forming the third polymer stream into a third colored bulked continuous carpet filament using the third spinning machine to form the third polymer stream into the third colored bulked continuous carpet filament; and (X) after the step of using the one or more fourth static mixers to substantially mix the fourth polymer stream with the fourth colorant, forming the fourth polymer stream into a fourth colored bulked continuous carpet filament using the fourth spinning machine to form the fourth polymer stream into the fourth colored bulked continuous carpet filament.

19. The method of claim 18, wherein:
the first colorant comprises a first liquid colorant;
the second colorant comprises a second liquid colorant;
the third colorant comprises a third liquid colorant;
the fourth colorant comprises a fourth liquid colorant;
the method further comprises providing a first pump operatively coupled to the first polymer stream via a first hose, a second pump operatively coupled to the second polymer stream via a second hose, a third pump operatively coupled to the third polymer stream via a third hose, and a fourth pump operatively coupled to the fourth polymer stream via a fourth hose;
adding the first colorant to the first polymer stream comprises using the first pump to pump the first colorant into the first polymer stream via the first hose;
adding the second colorant to the second polymer stream comprises using the second pump to pump the second colorant into the second polymer stream via the second hose;
adding the third colorant to the third polymer stream comprises using the third pump to pump the third colorant into the third polymer stream via the third hose;
adding the fourth colorant to the fourth polymer stream comprises using the fourth pump to pump the fourth colorant into the fourth polymer stream via the fourth hose.

20. The method of claim 19, further comprising:
providing a fifth colorant comprising a fifth liquid colorant,
providing a fifth hose;
changing the first colorant to the fifth colorant for the first polymer stream by:
ceasing adding the first colorant to the first polymer stream;
replacing the first hose with the fifth hose; and
adding the fifth colorant to the first polymer stream by using the first pump to pump the fifth colorant into the first polymer stream via the fifth hose;

after the step of adding the fifth colorant to the first polymer stream, using the one or more first static mixers to substantially mix the first polymer stream with the fifth colorant;

after the step of using the one or more first static mixers to substantially mix the first polymer stream with the fifth colorant, forming the first polymer stream into a fifth colored bulked continuous carpet filament using the first spinning machine to form the first polymer stream into the fifth colored bulked continuous carpet filament.

\* \* \* \* \*